(12) United States Patent
Youmans et al.

(10) Patent No.: US 12,378,014 B2
(45) Date of Patent: Aug. 5, 2025

(54) MODULAR APPARATUS, DESIGN, CONCEPT FOR MODULES, CONNECTION, ATTACHMENT AND CAPABILITY ADDING STRUCTURAL ADD ONS FOR VEHICLES, STRUCTURES

(71) Applicant: RHOMAN AEROSPACE CORPORATION, Pasadena, CA (US)

(72) Inventors: Thomas Andrew Youmans, Los Angeles, CA (US); Thomas Bradford Doermer Callen, Los Angeles, CA (US)

(73) Assignee: RHOMAN AEROSPACE CORPORATION, Pasadena, CA (US)

( * ) Notice: Subject to any disclaimer, the term of this patent is extended or adjusted under 35 U.S.C. 154(b) by 842 days.

(21) Appl. No.: 16/837,902

(22) Filed: Apr. 1, 2020

(65) Prior Publication Data
US 2020/0317324 A1 Oct. 8, 2020

Related U.S. Application Data

(60) Provisional application No. 62/827,863, filed on Apr. 2, 2019.

(51) Int. Cl.
*B64U 20/40* (2023.01)
*B64C 27/20* (2023.01)
*B64U 101/58* (2023.01)

(52) U.S. Cl.
CPC .............. *B64U 20/40* (2023.01); *B64C 27/20* (2013.01); *B64C 2211/00* (2013.01); *B64U 2101/58* (2023.01)

(58) Field of Classification Search
CPC ........................... B64C 2211/00; B64U 20/40
See application file for complete search history.

(56) References Cited

U.S. PATENT DOCUMENTS

| | | | |
|---|---|---|---|
| 10,583,922 B1 * | 3/2020 | Boyes | B64C 1/22 |
| 10,717,524 B1 * | 7/2020 | Boyes | B64D 43/00 |
| 2018/0273158 A1 * | 9/2018 | Courtin | B64C 1/26 |
| 2021/0107653 A1 * | 4/2021 | Baharav | B64D 5/00 |
| 2021/0339859 A1 * | 11/2021 | Agostino | B64D 1/10 |

* cited by examiner

*Primary Examiner* — Arfan Y. Sinaki
(74) *Attorney, Agent, or Firm* — Smith, Gambrell & Russell, LLP

(57) ABSTRACT

Modular add-on structures may be connected to a structure, such as a multi-rotor flight vehicle, using connection and release apparatuses. Replacement modules may be interchanged in one or more locations on the platform structure, and may provide an operating component that enables a capability once added, such as a medical bed for medical evacuation, a seat for manned flight control, a seat for passive riders, a cargo hold for the transportation of cargo, a cargo hold for transportation of an aid package, a liquid dispersing mechanism for dispersion of a liquid, other projectile disbursement mechanisms for disbursement of other non-liquid or projectile disbursement, flight through propulsion enabling attachment. A flight vehicle, such as a multi-rotorcraft flight vehicle, may support different capabilities and functionalities, where the design of the multi-rotorcraft, modular add-on structures, and multi-rotorcraft functionality, configuration, control, and shape, enable different uses, capabilities, and functionality.

22 Claims, 25 Drawing Sheets

MODULAR APPARATUS, DESIGN, CONCEPT FOR MODULES, CONNECTION, ATTACHMENT AND CAPABILITY ADDING STRUCTURAL ADD ONS FOR VEHICLES, STRUCTURES

CROSS-REFERENCE TO RELATED PATENT APPLICATION(S)

This patent application claims priority to U.S. provisional application 62/827,863, filed on Apr. 2, 2019, the contents of which are incorporated in their entirety herein. In accordance with 37 C.F.R. § 1.76, a claim of benefit is included in an Application Data Sheet filed concurrently herewith.

FIELD OF THE INVENTION

This invention relates to a methodology and apparatus where modular add-on structures (herein referred to as 'replacement modules') may be connected to a main structure or vehicle (herein referred to as 'platform structure'), where certain connection points methods and apparatuses enable the connection. More specifically, a replacement module will have a standard connection on the platform structure and a standard connector on the replacement module to enable a portion or structure of the vehicle to be replaced. The present invention covers the design of the replacement module concept, methodology of these modular changeable components, the standard connection components (located on the vehicle), the connector component (located on the replacement module), as well as the mechanism that enables the secure attachment of the replacement module to the platform structure, which may be a vehicle, and a non-exhaustive set of possible add-on structures, including a medical bed, cargo area or seat.

The present invention relates to a methodology and construction of an apparatus that enables structures to be connected or attached to another structure, where one structure may be a vehicle, and another structure may be a separate apparatus or structure, where the added apparatus may provide a capability to the vehicle, and multiple different structures would be able to connect to a vehicle in the same location, one or multiple at a time, in the sense that a modularity or modular capability is enabled, in so far as multiple different structures would have the ability to be connected to or affixed with the vehicle. Furthermore, the replacement structure could be attached or affixed to the same point or area of connection or securing, each enabling capabilities, and apparatuses attached could be switched.

BACKGROUND OF THE INVENTION

In many cases, a specific vehicle may be designed for a single purpose, for example carrying a passenger, or carrying cargo boxes. And in the case where the vehicle is designed specifically for carrying a passenger, a seat or riding structure for the passenger is typically engineered into the creation of the design of the vehicle, and it is connected with the vehicle. Additionally, in the case where the vehicle is designed to carry cargo, the area for cargo is specifically designed to be filled with boxes or other cargo, and this area itself, that is designed to be used for cargo, is part of the structure of the system, and not a separable part of the engineered structure of the vehicle.

In these cases, the structure supporting a capability is not designed to be easily changed from one purpose and according structure to another purpose and according structure, given that the piece of engineering created to support the intended purpose, the seat or riding structure or the cargo area, is built into the main system of the vehicle, and is often completely a part of the vehicle.

Furthermore, this manner where a vehicle is designed around a specific use or need, is extra prominent in finely tuned, or delicately balanced systems or vehicles. For example, flight vehicles may be finely tuned and delicately balanced, or often designed for specific purposes. Especially small flight vehicles, that have a lower total amount of mass, may be designed around seats for passengers, and these seats are built into the frame of the vehicle, or, for example, other small flight vehicles may be designed for cargo, and so a cargo area may be specifically built into the vehicle or planned for resting on top of or attached or hanging beneath the vehicle, and these cargo areas are not easily, smoothly, quickly, or otherwise able to convert to other purposes well.

The advancement of present vehicle methodologies and related apparatuses and systems through the incorporation of the present invention through its unique additions to the field enables the user to fundamentally alter the purpose and the intent of the vehicle by enabling the replacement of the major operating components of the vehicle through a modular design concept, methodology, systems, and apparatus outlined in the present invention.

BRIEF SUMMARY OF THE INVENTION

The present invention comprises a methodology where different structures or components can be added to the same or different places on another structure which may be a vehicle, as well as a system that allows for multiple structures or components to be added to a same or different place on a structure which may be a vehicle, and an apparatus which enables the attachment, connection, or capability to affix one or multiple structures to the same or different places on a structure which may be a vehicle, as well as the structures, functions, capabilities of the added modular pieces.

Advances in technology, methods, methodology, apparatuses that allow for a vehicle to support multiple purposes, and be specifically designed to most smoothly and optimally change between supporting multiple uses, is a major advance forward in the field—as the vehicle or platform requires new, novel, intentional and carefully crafted design choices to enable it to support an added structure that could enable different capabilities. The addition of this modularity for attaching structures that enable different or multiple use cases being attached to the same or otherwise points or parts of a vehicle allow for great strides forward in overall capabilities of a vehicle employing such a method, where this new and unique composition of elements, which may be individually found or used in other areas currently, but not combined in such a manner until the present invention, is a great, value adding step forward in planning and engineering of vehicles.

The present invention includes a modular design concept that may apply to a vehicle, which enables a user to change the primary operating components of the vehicle and seamlessly replace with a replacement module (or a modular changeable component) that encompasses a new set of operational components. Therefore, the platform structure, which may be a vehicle, is a platform that accepts the connection of many replacement module devices depending on the desired application. In discussion of the methodology, embodiments and apparatus options that encompass the present invention, a mod, module, modular device, capability adding structural device, add-on structure, or other set of terms describing an item added to another structure and, or, vehicle, may be construed and defined to be a same or similar item.

In embodiments, an apparatus may comprise a multi-rotorcraft flight vehicle comprising at least one standardized connection mechanism to attach at least one modular add-on structure to the multi-rotorcraft flight vehicle, where the multi-rotorcraft flight vehicle is configured to perform different functions and to have different capabilities based on attachment of different modular add-on structures to the multi-rotorcraft flight vehicle, and wherein the at least one standardized connection mechanism is configured to transfer items or information between the at least one modular add-on structure and the multi-rotorcraft flight vehicle and between a plurality of modular add-on structures.

In embodiments, when a modular add-on structure is attached to the multi-rotorcraft flight vehicle, capabilities and functionality of the modular add-on structure may be at least one of added, changed, adjusted, or enhanced. The at least one standardized connection mechanism may allow attachment of the at least one modular add-on structure on at least one of a top, side, or bottom of the multi-rotorcraft flight vehicle. The at least one modular add-on structure may change a functionality of the multi-rotorcraft flight vehicle by adding structural capabilities, including at least one of a seat, a medical bed, a cargo container, a packet distributor, a liquid distributor, an energy distributor, an aid distributor, or any combination thereof. The at least one modular add-on structure may change a functionality of the multi-rotorcraft flight vehicle by adding non-hardware capabilities including at least one of a control, a control function, power, data, signal, information, or any combination thereof. The multi-rotorcraft flight vehicle may further comprise a control system configured to adjust to accommodate at least one of different modular add-on structures, functions, or capabilities. At least one of signals, control functions, control signals, communication to motor and thrust controls, navigation, or GPS information may come from at least one modular add-on structure. At least one standardized connection of at least one modular add-on structure of the multi-rotorcraft flight vehicle may provide information relating to vehicle control and maneuverability.

In an embodiment, an apparatus may comprise a multi-rotorcraft flight vehicle comprising an adaptive control system configured to dynamically adjust control parameters, before and during flight, based on at least one of a multi-rotorcraft flight vehicle form factor, shape, payload, shifting of payload, calculated payload center of gravity, detected payload center of gravity, vehicle center of gravity, shifting payload center of gravity, overall system center of gravity, shifting system center of gravity, and moments of inertia, wherein at least one of flight dynamics, control systems, control methods, control parameters, an tuning parameters are at least one of configured, programmed to auto-adjust, self-tune, and adjust, using machine learning based on different multi-rotorcraft flight vehicle uses or functionalities, enabling different multi-rotorcraft functionality based on application of multi-rotorcraft adaptive controls.

In embodiments, when at least one modular add-on structure is attached to the multi-rotorcraft flight vehicle, the at least one modular add-on structure may change a functionality of the multi-rotorcraft flight vehicle. The adaptive control system may adjust for different flight vehicle configurations including at least one of different modular add-ons, different uses, different functions, different capabilities, and accompanying different centers of gravity and or moments of inertia. When at least one modular add-on structure is attached to the multi-rotorcraft flight vehicle, a functionality of the multi-rotorcraft flight vehicle may be changed by adding non-hardware capabilities including at least one of a control, a control function, power, data, signal, information, or any combination thereof. The multi-rotorcraft flight vehicle may receive at least one of control functions, control signals, communication to at least one of motor and thrust controls, at least one of navigation and GPS information, from at least one of one or more of the connection apparatus, or from at least one modular add-on structure, or any combination thereof. The multi-rotorcraft flight vehicle may receive at least one of control or control function or control system updates from at least one of at least one modular add-on structure or at least one modular add-on structure connection device. The multi-rotorcraft flight vehicle may comprise an adaptive control system residing on the multi-rotorcraft flight vehicle, and may be embedded in one or more compute elements on the flight vehicle. A modular add-on structure connection device may include at least one of control functions, control signals, communication to motor and thrust controls, navigation and GPS information, and other connection or information for or from the at least one modular add-on structure.

In an embodiment, a multi-rotorcraft flight vehicle may have a shape that is rectangular or oblong, and wherein the multi-rotorcraft flight vehicle is symmetric about exactly two axes perpendicular to each other, and its lengths along those axes are different when viewed from above, wherein the multi-rotorcraft may be configured such that the centers of each outer-most propeller are not equidistant along the line of a single circle when viewed from above.

In embodiments, the multi-rotorcraft flight vehicle may comprise 6 propellers. The multi-rotorcraft flight vehicle may have a length along one major axis that is not the same as a length of the vehicle along a second major axis when viewed from above, and wherein the major axes are the longest axes, which enables the multi-rotorcraft flight vehicle to support a plurality of modular add-on structures of different shapes. The multi-rotorcraft flight vehicle may not be symmetric about more than two axes perpendicular to each other, when viewed from above, and the two axes are of different length. The multi-rotorcraft flight vehicle may be rectangular and may be configured to accept attachment of modular add-on structures of having a plurality of shapes, sizes, and capabilities, including at least one of a seat, a medical bed, a cargo container, a packet distribution systems.

Likewise, additional capabilities may be covered by a modular add-on component, not described in the non-exhaustive list of embodiments of the present invention contained herein.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

Figure 1A:
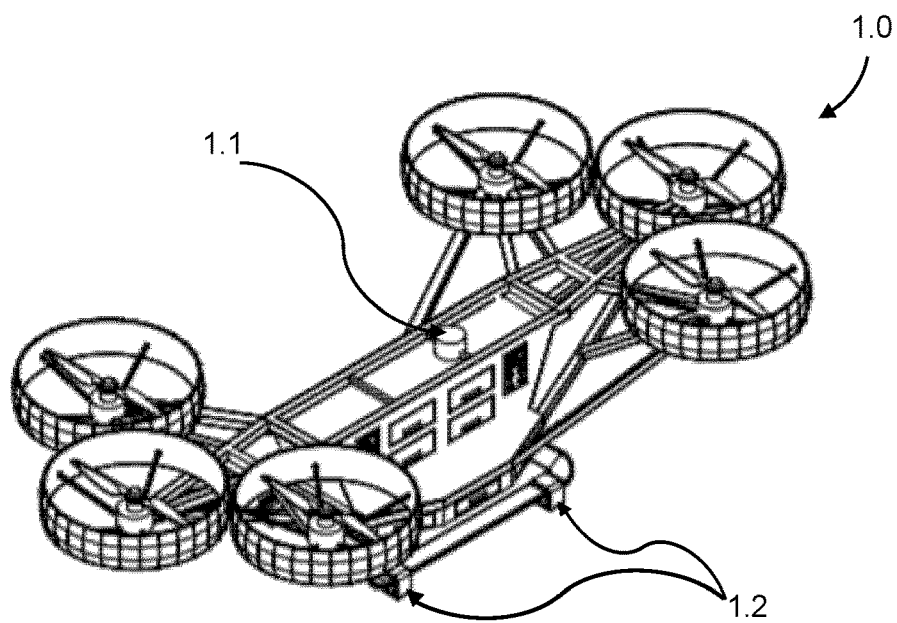
FIG. 1A shows a platform structure, in this case a VTOL (vertical takeoff and landing) vehicle, highlighting the elliptical or circular or 'peg' connection component.

The following details cover embodiments of the present invention, but are not an exhaustive list of embodiments of the present invention.

In an embodiment, the platform structure may be a vehicle, such as a flight vehicle, using propellers, jet thrusters, electromagnetic thrust elements, wings or other thrust or lift generating devices, and where the flight vehicle may be of a horizontal orientation, in a manner such as a car, boat or motorcycle, or may be in a vertical orientation, in the nature of a flying exoskeleton, or scooter, or a device where a person stands on it, for example a skateboard, or a wheeled gyroscopic sensor enabled vehicle upon which a person stands.

The replacement module (or modular changeable component) design enables, for example, the conversion of the vehicle from an autonomous medical evacuation transport vehicle to a manually controlled vehicle through a seat with pilot controls module, a seat that is for a passenger when a vehicle may be autonomously controlled, or a myriad of other purposes or replacement modules. Other applications could include, but are not limited to, a seat for a rider (FIG. 2, 3.1), various types of cargo containers (FIG. 4, 4.1, FIG. 10, 10.1), medical equipment or medical beds (FIG. 2, 2.1), firepower, robotic arms, water containers, fire extinguishing liquid containers, crop spraying devices, cameras or other imaging technology, or other devices is shown in the present invention.

In an embodiment, the replacement module may be separate from the vehicle, and may be square, rectangular, spherical, elliptical or otherwise shaped, or it may not be a standard shape in the case where it is a collection of structures connected together (metal or otherwise beams attached in a certain fashion that constitutes an own structure, but isn't a regularly defined shape) wherein the structure that is added may serve a purpose or provide a capability, for example a bed that can be attached or removed from the vehicle, or a seat or cargo container that may be added to or removed from the vehicle. The added structure may also be something other than mentioned including, but not limited to, seats, medical beds, cargo containers, firepower, water cannons, emergency aid delivery packages and still be encompassed by the present invention.

The concept and mechanical apparatus of the connection mechanism that connects the replacement module to a platform structure, which may be a vehicle, could occur in different locations on the platform structure which enables the replacement modules to be added to the top, bottom, side, or other location on the platform structure, which may be a vehicle. This connection device also enables the user to quickly remove and/or add the replacement modules. The structures may have the same attachment mechanism.

In an embodiment, on a portion of the platform structure, which may be a vehicle, there may be a convex, cylindrical peg connection device. The cylindrical device may carry all aspects including power, data, and other items, information or otherwise, to ensure that the replacement module will operate effectively, including, but not limited to, power, control functions, communication to motor and thrust controls, navigation and GPS information, and any other connection or information that the replacement module may require.

An embodiment of the invention includes a replacement module attachment mechanism that is damped or has dampening, or has automatic, computer or mechanically controlled dampening in to hold an attached module in a certain position or orientation despite movement a structure or vehicle. Furthermore, an attachment mechanism may maintain pointing, directionality or aim of an attached module.

In this embodiment, a convex, cylindrical peg connection device on platform structure, which may be a vehicle, will be plugged into a concave, cylindrical outlet located on a replacement module. The convex cylindrical device may also include outlets to accept any power source, navigation information, control functions, communication to the motors/thrust that are required to effectively operate the replacement module. Once the replacement module is successfully connected to the platform vehicle, all required power sources and other sources of information will be successfully connected to the replacement module.

In an embodiment, the replacement module may be able to attach to the platform structure, which may be a vehicle, through one or a series of points, where the method of connection may allow the replacement module to move relative to the vehicle, or the replacement module may be held fixed and not move relative to the vehicle. The replacement module may connect at a top, bottom, side, or other part of the vehicle, and may connect through one or more round, elliptical, rectangular, hook based, electromagnetic, rubber, metal, ceramic, carbon fiber, nano-particle, spring, hydraulic, manual, automatic or other connection or attachment device. The replacement module may not physically touch the vehicle or primary structure, it may be affixed using magnets, electromagnetic or light based methods, and may be fixed in position near to the primary structure. It also may by fully connected to the platform structure, in the case where a modular add-on structure is spot welded to a main structure. In the case of a very fast spot weld to a main structure, the spot weld could be quickly removed, and another modular add-on piece could be attached in its stead.

In a case of connection, attachment of affixing a replacement module to a main structure or vehicle, power for the replacement module may be supplied wirelessly or through planned and specific connection mechanisms for power, or power may be routed through systems or a system that is used to hold the added structure in place, affixed, or in its connected position with the main structure or vehicle.

Data, information, liquid, water, medical support fluid, anti-freeze, individual metal items that are separate from each other, cartridges, heat, air, or other items, particles, fluids, mechanical constructs, organic or non-organic materials, information, electromagnetic waves or electromagnetic wave based constructs may move between the platform structure, which may be a vehicle, and the replacement module upon attachment, or be able to move or flow between the platform structure, which may be a vehicle, and the replacement module based on intentional design where each potentially added structure is able to sync with the connection portion, pieces, or method of the primary structure or vehicle.

The modular elements that may be added to a platform structure, which may be a vehicle, may include, but is not limited to, a medical bed, seat for an active pilot, a seat for a passive rider, a cargo hold or cargo container, mechanical apparatus that propels other mechanical objects or other objects in a direction at a rate or a laser or other electromagnetic based energy in a direction with a power or at a rate, or a water cannon or other liquid disbursal system which may be for extinguishing fires or other purposes, or robotic arms or buckets, or pre-packaged aid deliver devices of items, or other structural items.

Additionally, the replacement module may be a flight enabling device—for example wherein a platform structure is an exoskeleton suit, or a coat or vest with an attachment point on the back, sides, shoulders or otherwise, a replacement module may be attached that is a set of propellers, propulsion devices, wings or otherwise, that enables flight. In this embodiment of the invention as described in the present invention as connecting a structure (the replacement module) to the platform structure (the exoskeleton or bodysuit), a modular add-on is made to a structure or vehicle, and a standard or non-standard connection points may be used, in one or more locations on the exoskeleton and or the modular attachment, and thus the added capability of the modular attachment is realized with the primary structure to which it is attached. The attachment may receive power, data or otherwise, through a or multiple connection points, as described in the present invention.

Figure 1B:
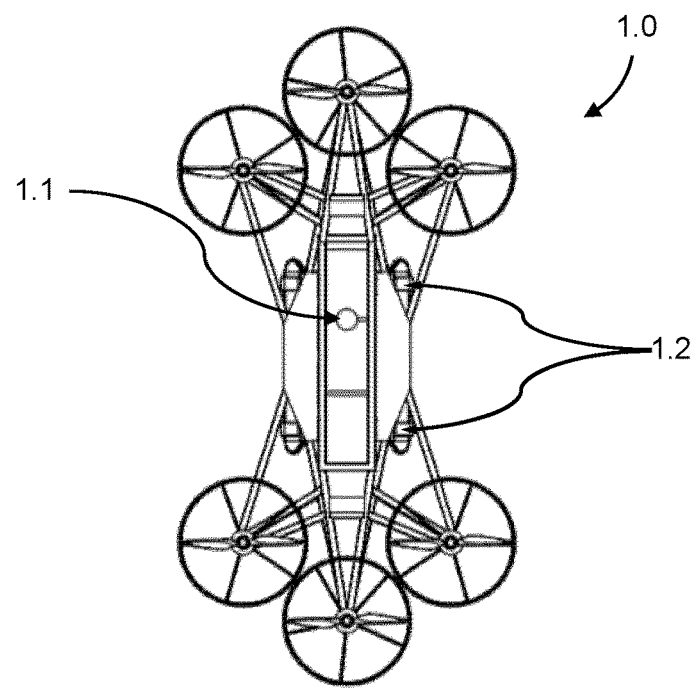
FIG. 1B shows a top view of the a platform structure, a vertical takeoff and landing (VTOL) vehicle, specifically highlighting an example of a connection mechanism, the peg connection.

In an embodiment of the method of the present invention, a platform structure may be a flight vehicle that is a vertical take-off and landing (VTOL) flight vehicle, and may be a multi-rotorcraft vertical take-off and landing flight vehicle, as in FIGS. 1A and 1B. As in the method of the present invention, a VTOL multi-rotorcraft may be designed to include one or more standard attachment mechanisms for modular add-on components, and it may be designed to fit multiple different modular add-on components, which may be called payloads or payload attachments. A flight vehicle of the present methodology may be made and built to have multiple capabilities and serve multiple use cases with the different modular add-on components. A flight vehicle may be designed to fit with multiple modular add-on components, and may have a shape to be able to support multiple modular add-on components. A multi-rotorcraft may be designed to fit cargo containers, seats, medical beds, particle and or package and or liquid distributions systems, and or other systems as described in the present invention. As such, in that a multi-rotorcraft may be designed to fit with multiple different modular add-on components, a multi-rotorcraft may be designed to be rectangular as in FIG. 1A, FIG. 1B, FIG. 5, FIG. 8, and FIG. 9.

In order to support different modular add-ons in accordance with the method of the present invention, a multi-rotorcraft may be rectangular such that a medical bed may fit on it, other cargo containers of certain shapes may fit on it, seats may fit on it, or any modular add-on and or capability adding modular add-on and or use case enabling modular add-on, including power, data, aid, cargo packet, control, control system, control function, electromagnetic wave transmitting, or otherwise modular add-ons.

Likewise, in accordance with the present method, a multi-rotorcraft may be rectangular as in FIG. 1A, FIG. 1B, FIG. 5, FIG. 8, and FIG. 9, so that it can support multiple uses as within the present invention, and to support multiple different use cases and multiple different modular add-ons in accordance with the present invention, a multi-rotorcraft may be symmetric about two axis from above, when looking down from above, or described as per a birds-eye-view as it is typically used; a multi-rotorcraft may be rectangular or oblong as in FIG. 1A, FIG. 1B, FIG. 5, FIG. 8, and FIG. 9, and as in FIG. 1A, FIG. 1B, FIG. 5, FIG. 8, and FIG. 9, it may be asymmetric about more than two axis from above, it may symmetric about exactly two axis from above, it's symmetry about those two axis may be different in that it may be rectangular or oblong instead of square or round or rounded, it may be entirely asymmetric. A flight vehicle may use the methodology of the present invention while being symmetric about every axis or infinite axis when viewed from above, also known as a circle, or it also may be a square, or another shape. In accordance with the method of the present invention, a structure that support multiple use adding modular add-ons through a plurality of standardized connection modules may be a flight vehicle that is a multi-rotorcraft, and in accordance with the method of the present invention, the multi-rotorcraft may support multiple modular add-ons or modular additions, and multiple use cases, and fit with multiple capability adding modular add-ons, and be designed to support these add-ons, and be six propeller multi-rotorcraft as in FIG. 1A, FIG. 1B, FIG. 5, FIG. 8, and FIG. 9, and be rectangular or oblong, as in FIG. 1A, FIG. 1B, FIG. 5, FIG. 8, and FIG. 9, and may be symmetric about exactly two axis when viewed from above, where it's symmetry about those two axis may be different in that it doesn't have the same symmetry about those two different axis, and it may be rectangular or oblong as in the present invention and shown in FIG. 1A, FIG. 1B, FIG. 8, and FIG. 9.

In accordance with the method of the present invention where a flight vehicle may be a multi-rotorcraft that is rectangular or oblong, it may be symmetric along two axis that are at right angles to each other, and it may be such that the symmetries are different, i.e. the lengths of the flight vehicle along those two axis are different. It may also be that the propellers have different numbers of blades or are different sizes, and it may still be of a rectangular shape such that it is explicitly covered in the present invention, as in FIG. 1A, FIG. 1B, FIG. 5, FIG. 8, and FIG. 9.

As described in the method of the present invention, a vehicle may be considered rectangular or oblong if it meets any one of or multiple of or every of rectangular or oblong outer dimensions, frame, body, main frame, payload area, and symmetric about exactly two axes or major axes as explained within the present invention, and centers of propellers or outermost propellers lie along a circle and are equidistant or roughly equidistant, and standard to the field of practice of expert or engineering judgement that a vehicle is rectangular or oblong; explanations of symmetry here and elsewhere are when viewed from above, such as a birds-eye-view, also as in the x-y plane of the flight vehicle while it is horizontal, in its hover flight position or in its forward flight position.

Symmetry may be about a major axis and a second major axis, where these major axes are along the longest and second longest length of a flight vehicle, when looking down from above, as in an x-y plane, as in a birds-eye-view; in some cases, based on propeller positioning, major axes may not strictly be along the two longest dimensions of the flight vehicle, but may be along the two dimensions of a rectangular body or the longest dimensions of an oblong body or frame or main frame or payload carrying area of a flight vehicle, or may be based on the locations of the centers of the propellers. Furthermore, a description of a rectangular or oblong flight vehicle as covered in the present invention, along with being symmetric about exactly two axis at right angles with each other or perpendicular with each other may be described as a flight vehicle where a single circle shape cannot pass through the center of each propeller with the centers of the propellers being equidistant from each other or roughly equidistant from each other, (also including the outer-most propellers if a vehicle has many propellers that don't just form the outside of a shape but include many propellers in between each other), but only an oblong circular shape such as an ellipse could pass through the centers of each propeller.

The method of the present invention is not limited to only flight vehicles that are rectangular, but the method of the present invention, the modular add-ons, the connection apparatuses and the flight vehicle and flight vehicle characteristics are still within the present invention if a flight vehicle is symmetric or round or rounded or square, or pentagon, hexagon, octagon or otherwise shaped.

Figure 8:
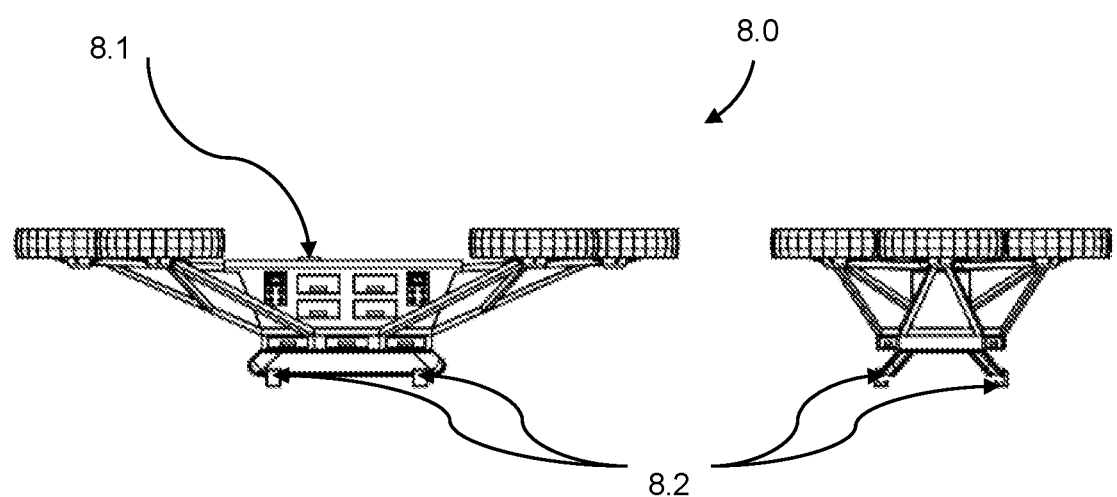
FIG. 8 shows a lateral view of one example of a platform structure, in this case a vertical takeoff and landing (VTOL) vehicle, showing the connector bars, as a mechanism for connection of a mod or module to a structure of vehicle.

As pictured in FIG. 1A, FIG. 1B, FIG. 5, FIG. 8, and FIG. 9, in accordance with the method of the present invention, multi-rotorcraft may have six propellers, and they may be distributed with three on one side of a rectangular shape of a multi-rotorcraft flight vehicle and three on another side of a rectangular shape of a multi-rotorcraft flight vehicle. As in the present invention, a multi-rotorcraft flight vehicle may be designed to support multiple modular add-ons and use cases, and have a rectangular shape, and a multi-rotorcraft flight vehicle may have a rectangular area on top where a modular add-on may fit as shown in FIG. 1A, FIG. 1B, and FIG. 8, or on a side, or on a bottom as shown in FIG. 1A, FIG. 1B, and FIG. 8. In accordance with the method of the present invention, a multi-rotorcraft may also have standardized connection mechanisms or ports on a top (1.1 and 8.1), and one or more connection ports may be at least one of inside or around a rectangular area on a top of a multi-rotorcraft (1.1 and 8.1); likewise in accordance with the method of the present invention, a multi-rotorcraft may have one or more connection ports on a bottom (1.2 and 8.2), and one or more connection ports may be at least one of inside or around a rectangular area on a bottom of a multi-rotorcraft flight vehicle (1.2 and 8.2).

In accordance with the methodology of the present invention where a structure that is a multi-rotorcraft flight vehicle may support different modular add-ons and change its capabilities and use cases with those different modular add-on structures, in order to accomplish the different functionalities of the modular add-on structures, a flight vehicle as shown in FIG. 1A, FIG. 5, FIG. 8 and FIG. 9 may fly differently with different modular add-ons, as it accomplished the different functionalities and capabilities of the different modular add-on structures. Likewise, as in the methodology of the present invention, a vehicle may receive different vehicle controls, control functions, navigation, communication to motors/thrust, from or through at least one of a modular add-on, connection apparatus, flight vehicle adaption to modular add-on to support the capabilities of the attached modular add-on. In accordance with the methodology of the present invention, a structure as part of the present invention that is a flight vehicle may adapt its control system to account for the attached modular add-on, in that as within the present invention a structure that may be a multi-rotorcraft flight vehicle is able to receive multiple different modular add-on structures and support different capabilities and functions of different modular add-on structures, and fly or deploy with different modular add-on structures, and is capable of accomplishing the different functions or capabilities of the different modular add-on structures through adaptive controls, adapting controls to at least one of varying use cases or needs for varying functions or capabilities or use cases, including relative to the modular add-on, including cargo or passengers or pilots in cargo beds, on seats or medical beds or otherwise. As such, in accordance with the method of the present invention, a flight vehicle that at least one of has, uses, adaptive control, adaptive control systems, dynamic or self-adjusting control systems, covering control systems, parameters, control methodologies, and other aspects of a control system that adapt or adjust. Furthermore, a multi-rotorcraft of the present invention may include a control system, a control system that adapts to at least one of modular add-ons, capabilities, functions, different modular add-ons, different capabilities, different functions, an adaptive control system, such that it resides on the multi-rotorcraft flight vehicle, where it may be embedded in one or more compute elements of the flight vehicle.

In accordance with the method of the present invention, while in accomplishing the method of the present invention, a control system may be adaptive, based on different use cases, capabilities, functionality of a multi-rotorcraft, and may be based on a modular add-on attached to the vehicle, as well as a shifting payload on or in a modular add-on, or on or in a multi-rotorcraft, or based on different capabilities, use cases, functionality. As such, an adaptive control method accomplishing the method of the present invention may use machine learning and, or, algorithms that may adjust, update, change, any one of control system choice, control system, control system selection, control functions, parameters, tuning of control systems, and may be based on any one of, combination or of all of multi-rotorcraft form factor, shape, use cases, modular add-ons, vehicle center of gravity, vehicle shifting center of gravity, payload, payload center of gravity, shifting payload center of gravity, overall system including vehicle and or modular add-on and or payload center of gravity and or overall vehicle and or modular add-on and or payload shifting center of gravity. Measurements, detection, understanding of, calculation of or in relation to, any center of gravity may be accomplished by a multi-rotorcraft, connection mechanism, modular add-on. Use of center of gravity in any case may include inertias and or moments of inertia.

In accordance with the method of the present invention where a multi-rotorcraft flight vehicle may perform a use case, land, quickly swap modular add-ons modules using quick-release latches and capabilities, then quickly deploy and accomplish another use case based on its different capabilities and functionality with the replacement of the modular add-on, a multi-rotorcraft flight vehicle may land and then quickly take off again, and in accordance with the method of the present invention to accomplish this method, it may be able to quickly deploy or launch and fly again, and in accordance with this it may have fast swapping batteries, power sources, plugs, that are accessible from the outside of the vehicle, as shown on the sides of a multi-rotorcraft flight vehicle in FIG. 1A, FIG. 5, FIG. 8 and FIG. 9. In accordance with the method of the present invention, where modular add-ons and fast release and attachment connection apparatuses allow for quickly changing capabilities, and the methodologies and platform structures which may be a flight vehicle as described in the present invention provide the capabilities of the method of the present invention, an embodiment of the method of the present invention includes a flight vehicle or vehicle or structure that is able to quickly change modular add-on structures and quickly re-launch or re-deploy, and apply the capabilities of the attached replacement structure, and structures which may be a flight vehicle that include modular attachment connection apparatuses and support modular add-on replacement modules and enable the methodology of the present invention are covered in the present invention, fast exchangeable power systems as shown on the sides of a multi-rotorcraft in FIG. 1A, FIG. 5, FIG. 8 and FIG. 9 are within the methodology of the present invention.

Likewise, the methodology of the present invention allows a flight vehicle to land and quickly change modular add-ons through quick release and attach connection apparatuses, and to quickly re-launch or re-deploy to employ the different capability or function of the added modular add-on, and the present invention includes a structure that may be a flight vehicle that accomplishes the methodology of the present invention, and in so, in order to re-deploy or re-launch quickly and be able to perform the added capabilities of the added modular add-on, it includes fast swappable power for flight, enabling the methodology of the present invention, a person must be able to switch the modular add-ons, and as shown in FIG. 1A, FIG. 5, FIG. 8 and FIG. 9, a multi-rotorcraft with propellers has shrouds that surround the outside edges of the propellers, in so that a person may safely approach the flight vehicle, so that the modular-add on attachments may be changed, so that a multi-rotorcraft structure as described in the present invention accomplishes the methodology of the present invention.

In accordance with the method of the present invention, an apparatus that is a multi-rotorcraft flight vehicle configured to use an adaptive control system for different use cases, functions, capabilities, in such that in alignment with the method of the present invention, an apparatus that is a multi-rotorcraft serves different functions and has different capabilities, which may serve different use cases and may come from an attachment of a modular add-on. Likewise, a connection apparatus may send control, control function, information, navigation, GPS, signals, information to a flight vehicle, and a modular add-on may send control, control function, information, navigation, GPS, signals, information to a flight vehicle, where an addition of a modular add-on, or an attachment of a modular add-on, may add capabilities, and may be a hardware add-on with hardware capabilities of a non-hardware add-on, with non-hardware, non-structural, capabilities, ins so far as including software, controls, control functions, signals, information. As in alignment with the method of the present invention and an apparatus of the present invention, a multi-rotorcraft may change its capabilities and or functionality, and this may be through non-hardware, and this may be through signals, control, control functions, information, navigation, GPS, that adjust to change the capabilities of function of an apparatus that is a multi-rotorcraft flight vehicle, and in so doing, it may adjust or update or change its control system, controls, control function, and in so doing it may have a control system that adapts, to modular add-ons, with connection or to connection apparatuses with signals and or controls and or information, and or it may adjust itself or adapt, allowing a system to adjust or adapt control systems, controls, parameters, to adjust or change capability and or functionality. In accordance with the present invention, a flight vehicle that is a multi-rotorcraft may adapt its control system.

In alignment with the methodology of the present invention and an apparatus of the present invention, where a multi-rotorcraft flight vehicle may have a control system that updates, a control system that adapts, adapts for modular add-ons, connection apparatuses, for changed or functionality or capabilities, adapting as such on a flight vehicle, including to modular add-on structures and according different sizes of modular add-ons, and accordingly to different weights, positions, centers of mass, centers of gravity, changing centers of mass and or gravity of modular add-ons, including payloads in and or on modular add-ons, a multi-rotorcraft that is an apparatus of the present invention may have a dynamic control system, where flight dynamics, control systems, control methods, control parameters, tuning parameters may be configured, programmed to adjust. In so adjusting, a control system, as on a flight vehicle, as coming from a connection apparatus and or a modular add-on, may tune, may self-tune, may self-adjust and or auto-adjust, based on flight, modular add-on, payload, the whole system, and or any shifts thereof. In order to accomplish the methodology of the present invention, to auto-adjust, self-tune, adjust, an apparatus of the present invention, along with a method of the present invention may be configured to use, programmed to use, and use, the application of machine learning and other algorithms, based on different multi-rotorcraft uses, functionalities, performance needs, flight needs, information.

In accordance with the method of the present invention and an apparatus of the present invention, adaptive and or dynamic control systems enabling adjusted or changed or different capability, in alignment with the method of the present invention, may enabling different multi-rotorcraft functionality through the unique application of multi-rotorcraft adaptive controls, and be configured to adjust, tune, self-tune, self-select control systems, and or other control adjustments.

Based on controls, control functions, signals, information from one or more connection apparatuses, along with optionally the attachment of modular add-ons, other payloads, and in accordance with accomplishing the method of the present invention of flying with modular add-ons, including different sizes, shapes, weights, and other factors of modular add-ons or payloads or shifting payloads, a control, control function, control system, may adjust, may adjust dynamically, before lunch or during flight, to different modular add-on structures, including to different weights, locations, centers of mass, moments of inertia, and any shifts therein of any of the above, before flight, during flight, and as needed.

In accordance with the present invention, a control system used by the multi-rotorcraft of the present invention is configured to, programmed to, embodies an apparatus that, dynamically adjusts control system, control parameters, before and during flight, with information and or signals from a connection apparatus, modular add-on or the multi-rotorcraft, using algorithms including machine learning, ai, algorithms, based on at least one of multi-rotorcraft form factor, shape, payload, modular add-on structures, use, functionality, and or capability. Furthermore, shifting payload, and any or all of calculated or detected payload center of gravity, vehicle center of gravity, shifting center of gravity, and overall system center of gravity, shifting system center of gravity, including any moments of inertia, may be accounted for by an adaptive, dynamic, dynamic adaptive, control system of the present invention. Determination, calculation, or otherwise knowledge and or self-knowledge by a multi-rotorcraft flight vehicle regarding a center of mass, center of gravity, moment of inertia, of a flight vehicle, multi-rotorcraft, payload, modular add-on, connection apparatus, and or any combination of any of the above, and or any combination of any shifts, changes, adjustments, movements, intentional movements, robotic movements of any one, combination or all of the above, may be accomplished by a multi-rotorcraft flight vehicle of the present invention, a connection apparatus of the present invention, and or a modular add-on of the present invention. A modular add-on, performing any of the capabilities, or adding function or capability to a multi-rotorcraft flight vehicle, may be a structural addition, or a non-structural addition. As such, it may be structurally attached external to the multi-rotorcraft, and or connected within the multi-rotorcraft, and or loaded onto a software or compute system of a multi-rotorcraft, connection apparatus, modular add-on.

In the context of the present invention, an exoskeleton suit or body suit may be considered a vehicle. An exoskeleton suit or body suit may be considered a vehicle in many ways, a way in with they may be considered vehicles is that they may have the ability to aid in transporting, moving, or otherwise accomplishing tasks that a vehicle or mechanical structure may enable, that may include a person in, on, nearby, controlling directly, controlling indirectly, functional autonomously or otherwise accomplishing something that a vehicle may aid in accomplishing.

FIG. 1A shows an examples of platform structure 1.0, in this case a VTOL (vertical takeoff and landing) vehicle. This view highlights the elliptical or circular or 'peg' connection component, where the modular add-on can fit on a top of the vehicle; in this case, the design and shape of the vehicle is intentional and particularly made to work with specific and multiple modular add-on components, through is size and shape. FIG. 1B shows a top view of the example platform structure, a vertical takeoff and landing (VTOL) vehicle, specifically highlighting of example of a connection mechanism, the peg connection;

1.1 shows the peg, elliptical, circular, connection piece located on the platform structure, and 1.2 shows an example of a connection mechanisms used to connect an add-on or replacement structure to platform structure.

Figure 2A:
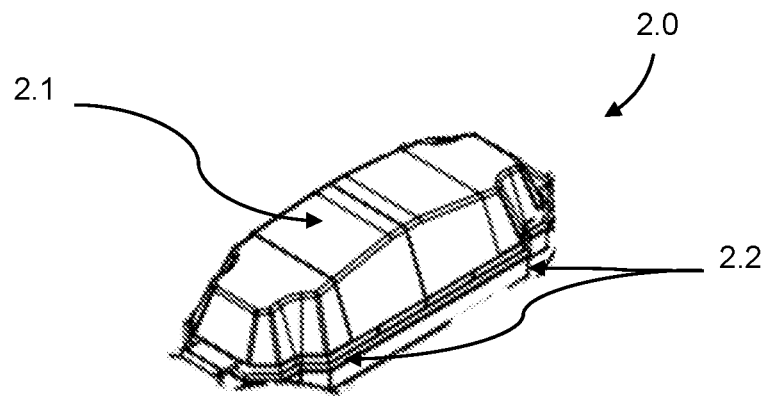
FIG. 2A shows a replacement structure, in this case a medevac bed, where a medevac bed has a cover that can slide and lift or rotate; shown with cover closed.
Figure 2B:
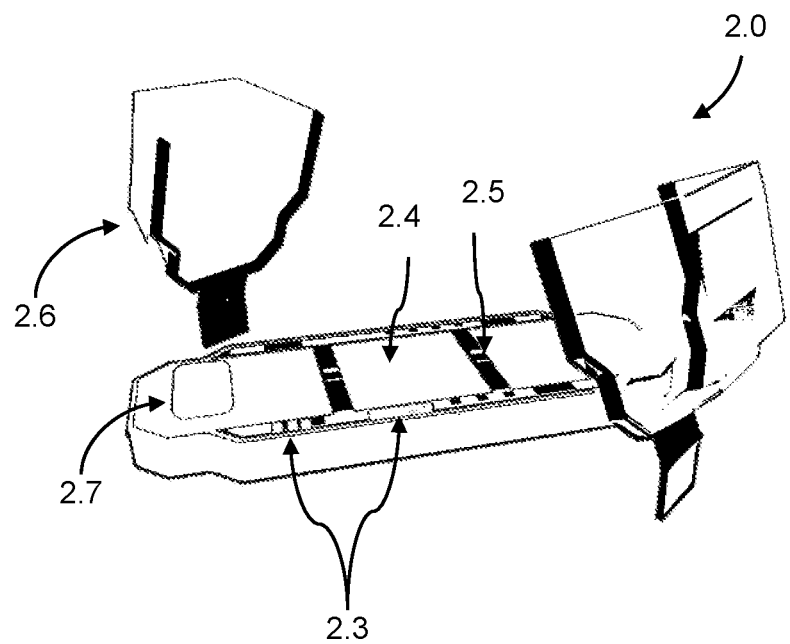
FIG. 2B shows a replacement structure, in this case a medevac bed, where a medevac bed has a cover that can slide and lift or rotate; shown with cover open, showing interior including straps, pillow and medical monitors.

FIG. 2A shows an example of a replacement structure 2.0, in this case a medevac bed, where a medevac bed has a cover that can slide and lift or rotate; in FIG. 2A it is shown with cover closed; the rotation of the medical bed is a unique and intentional design aspect of the bed allowing for unique capabilities and the tilting cover is also a unique and intentional design allowing for unique capabilities. FIG. 2B shows an example of a replacement structure, in this case a medevac bed, where a medevac bed has a cover that can slide and lift or rotate; shown with cover open, and pillow and medical straps are also shown; also including medical monitors, screens, ports for drips and life support, defibrillators or other autonomously active life support technology.

2.1 shows an example of a replacement structure 2.0, in this case a medical evacuation bed, 2.2 shows an example of a connection mechanism used to connect replacement structure to platform structure, 2.3 shows medical monitors, screens, ports for drips and life support, defibrillators or other autonomously active life support technology, 2.4 shows medical cushioning or cushioning, 2.5 shows medical movement restraint straps, 2.6 shows folding and or sliding medical bed cover, and 2.7 shows a pillow, medical pillow or movement restraint, posture maintaining pillow.

Figure 3:
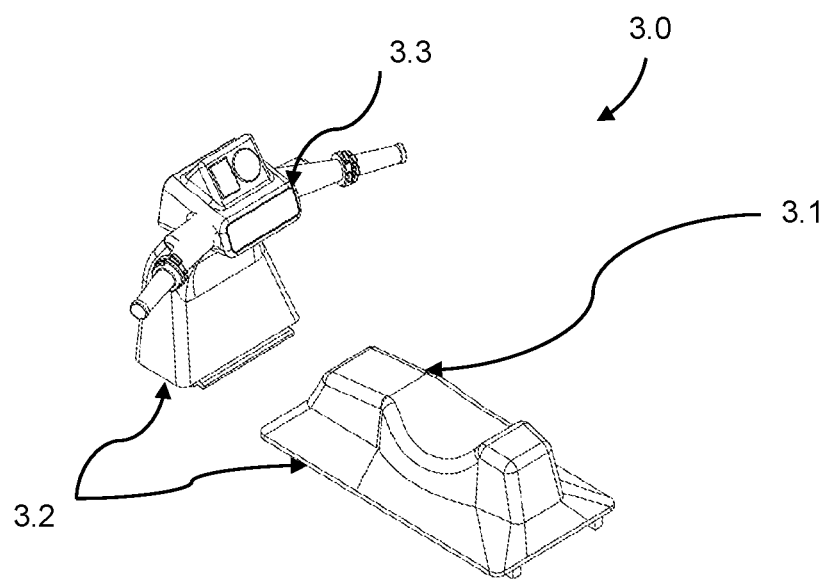
FIG. 3 shows a replacement structure, piloted flight controls, where a passenger or pilot may sit, as well as informational gauges or screens.

FIG. 3 shows an example of a replacement structure 3.0, in this case manned flight controls, where flight controls may be intuitive and account for lean or tilt of a rider, may sense changing center of gravity or changing center of mass of a rider, and or may be for a passive rider during autonomous flight, may be embedded in, under, on top, connected with a seat or sitting or standing structure; flight controls may include joysticks, remotes, touch screens, GPS input, mechanical or otherwise levers, control surface adjustment mechanisms, computer terminals, eye tracking devices, head and or gaze direction trackers, EEG brain wave detection, or other capabilities allowing control of a vehicle or structure by a rider, pilot; may include informational gauges or screens or autonomous flight control and destination input screens.

3.3 shows an example of a replacement structure, in this case manned flight controls, 3.2 shows an example of a connection mechanism used to connect replacement structure to platform structure, and 3.1 shows an example of a seat based attachment module including navigational maps and other information screens, as well as inputs.

Figure 4A:
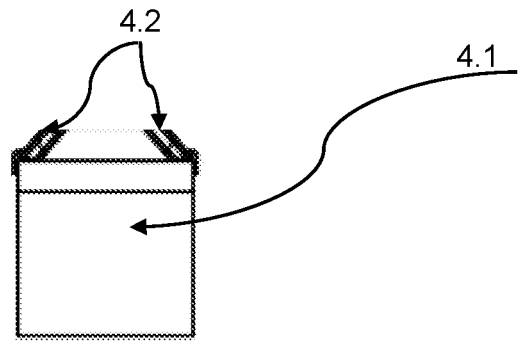
FIG. 4A shows a replacement structure, a cargo module.

FIG. 4A shows an example of a replacement structure 4.1, in this case a cargo module, where an attachment module may have quick release capability including through mechanical hooks or other means, to release a cargo, quickly; a quick release or deploy system may be used. 4.1 shows an example of a replacement structure, in this case a cargo module, 4.2 shows an example of a connection mechanism used to connect replacement structure to platform structure.

4B shows an example of a replacement structure, in this case a cargo module with quick release connection points, 4.3 shows a connection apparatus on cargo structure that may include quick release or auto release or auto drop capabilities.

Figure 5:
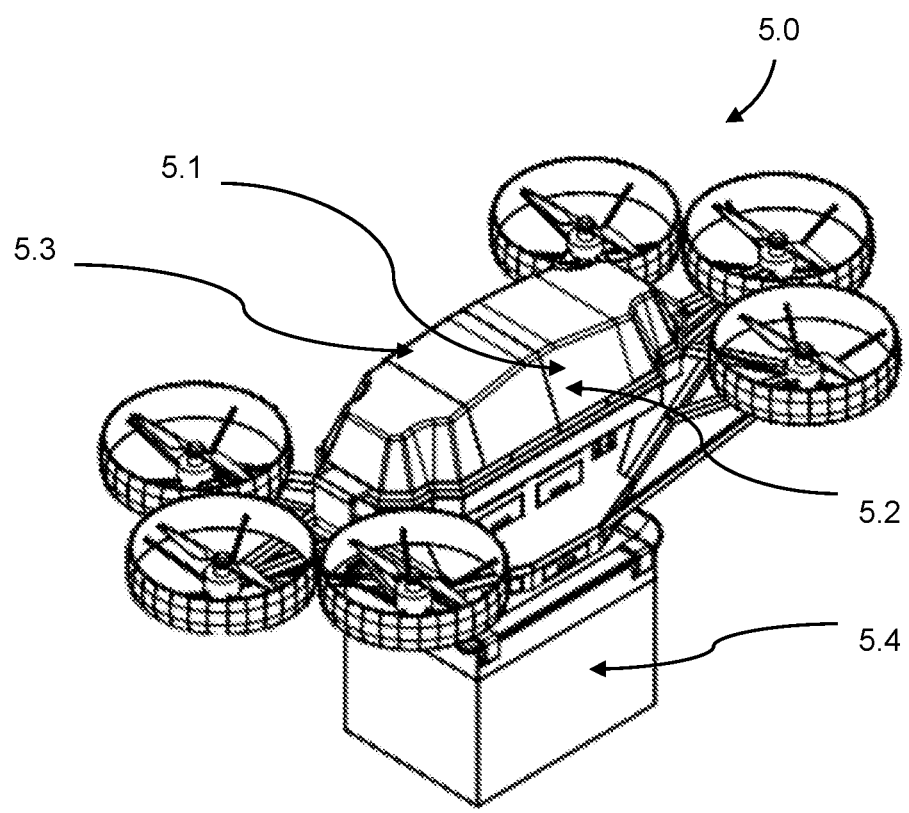
FIG. 5 show multiple replacement structures connected to multiple locations on a platform structure concurrently, in this case a medical evacuation bed attached to a top of a vertical take-off and landing (VTOL) vehicle while a cargo structure is attached to another part of the same vehicle, to a bottom.

FIG. 5 shows an example of multiple replacement structures connected to multiple locations on a platform structure 5.0 concurrently, in this case a medical evacuation bed attached to a top of a vertical take-off and landing (VTOL) vehicle while a cargo structure is attached to another part of the same vehicle, to a bottom. The unique and intentional shape and form factor of the platform, in this case the unique and intentional shape of the VTOL flight vehicle enable certain value-add functionalities and fitting with the modular add-ons. Intentional design includes a rectangular and or oblong shape.

5.1 shows a location of the peg connection piece located on the platform structure that connects the replacement structure to the platform structure (unseen in this image), 5.2 shows an example of a connection mechanism used to connect replacement structure to platform structure, location of peg connection piece located on the modular attachment structure, 5.3 shows an example of a replacement structure, in this case a medical evacuation bed, and 5.4 shows an example of a second modular structure attached to a vehicle, a lower cargo container.

Figure 6:
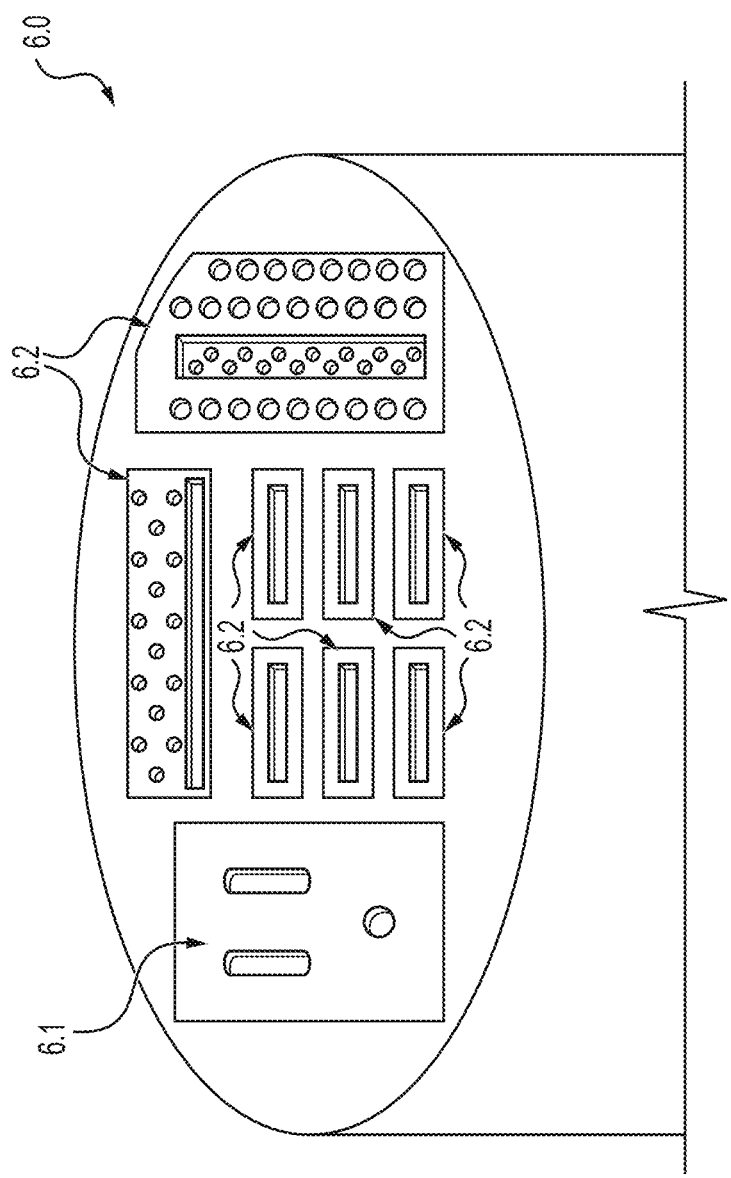
FIG. 6 shows a close up of a standard connection mechanism including power, control, data, and other outlets.

FIG. 6 shows a close up of a standard connection mechanism 6.0 (on the platform structure) including power, control, and other outlets; typically these outlets would be for power, data, telemetry, sensory readout, but some outlets may be for liquid, ammunition, or other items, where liquid or other items comes from a main structure or flight vehicle, and is passed or sent to the modular add-on.

6.1 shows a power connection, and 6.2 shows an example of outlets for other sources of information or power, possibly including data or other digital elements, or non-digital elements, including liquid or ammunition or other non-digital elements.

Figure 7:
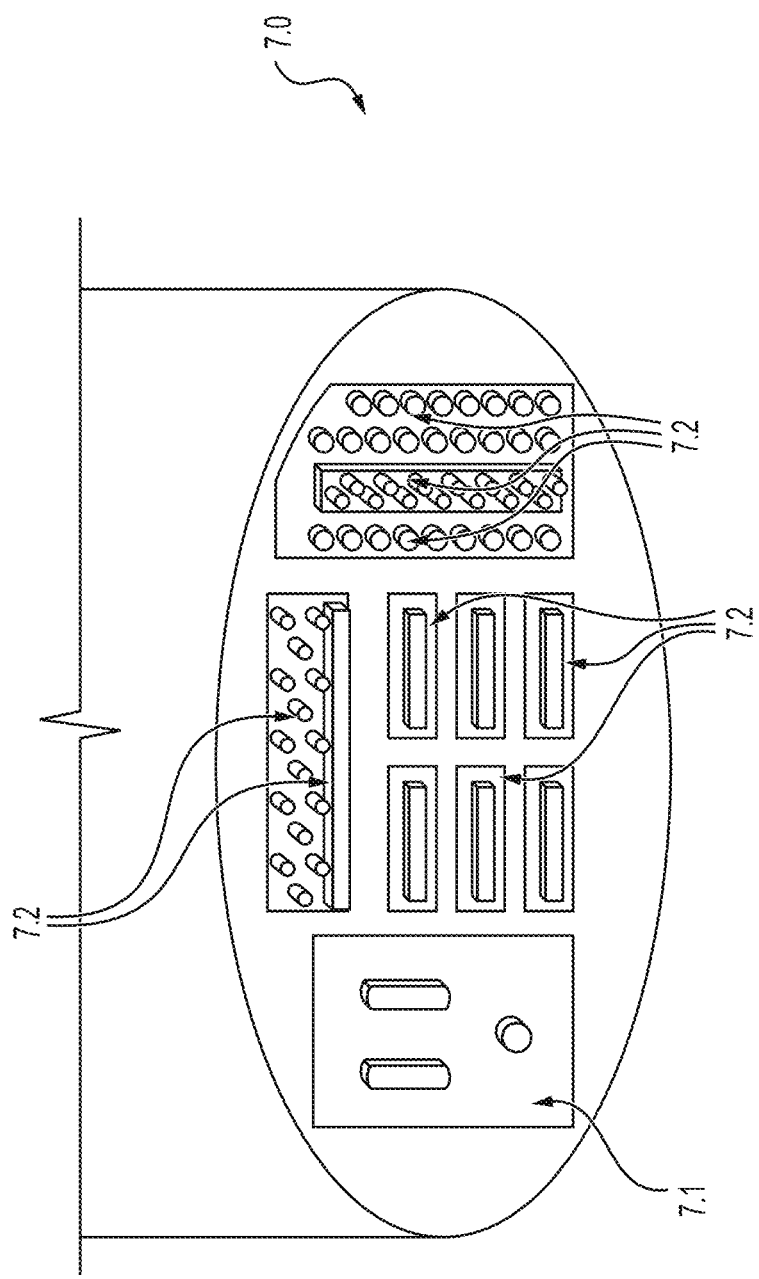
FIG. 7 shows a close up of a connector on the replacement module, including power, control, data, and other outlets.

FIG. 7 shows a close up of the connector 7.0 (on the replacement module); typically these outlets would be for power, data, telemetry, sensory readout, but some outlets may be for liquid, ammunition, or other items, where liquid or other items comes from a main structure or flight vehicle, and is passed or sent to the modular add-on.

7.1 shows a power connection, and 7.2 shows an examples of outlets for other sources of information or power; typically these outlets would be for power, data, telemetry, sensory readout, but some outlets may be for liquid, ammunition, or other items, where liquid or other items comes from a main structure or flight vehicle, and is passed or sent to the modular add-on.

FIG. 8 shows a lateral view of one example of a platform structure, in this case a vertical takeoff and landing (VTOL) vehicle 8.0, showing the connector bars, which are part of the present invention as a mechanism for connection of a mod or module to a structure of vehicle; these connection points may be part of a fast-deploy or cargo or payload drop or attachment system.

8.1 shows an example of a connection device, in this case a peg connection piece located on a top side a platform structure, and 8.2 shows an example of a connection device, in this case an interlocking bar connection mechanism located on an underside of a platform structure.

Figure 9:
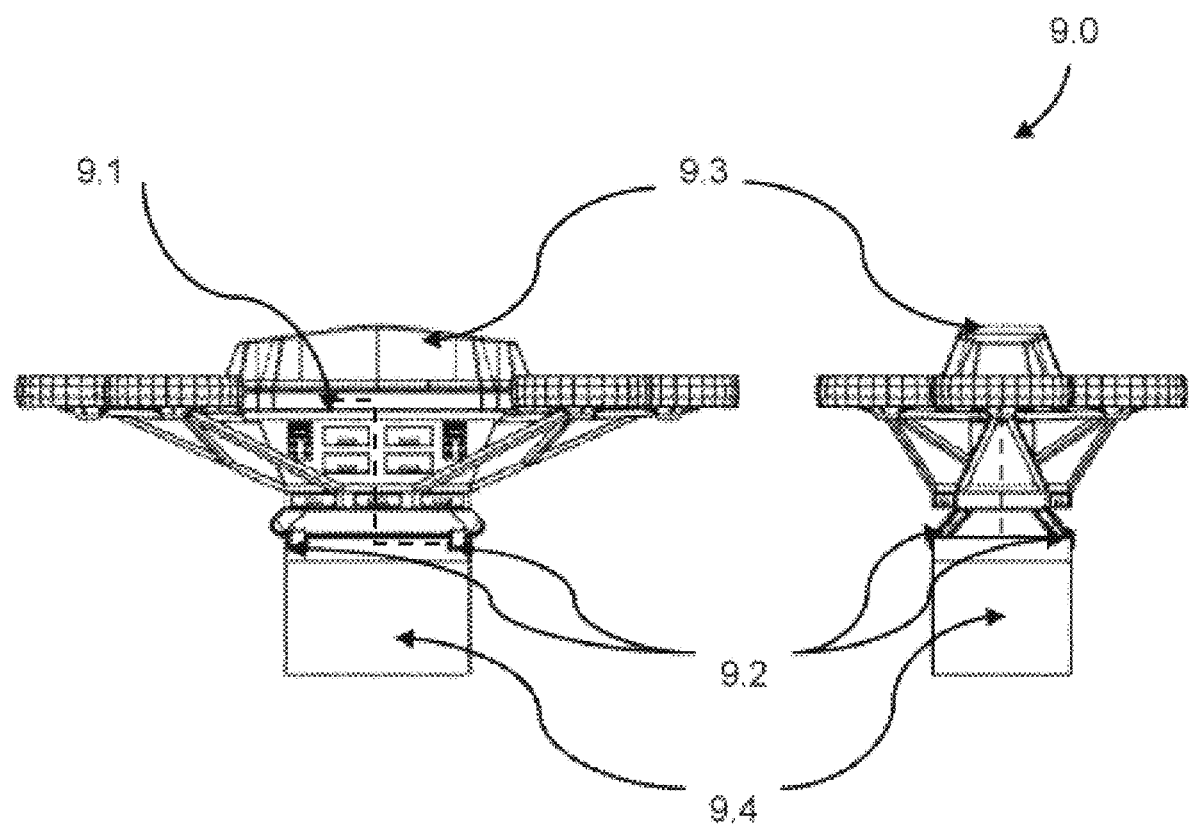
FIG. 9 shows a lateral view of one example of a platform structure, in this case a vertical takeoff and landing (VTOL) vehicle, showing the connection once connected, including multiple modular attachments, in multiple locations of a vehicle or structure, a medical bed and cargo container.

FIG. 9 shows a lateral view of one example of a platform structure, in this case a vertical takeoff and landing (VTOL) vehicle 9.0, showing the connection of modular additions once they are connected to it, including multiple modular attachments, in multiple locations of a vehicle or structure, a medical bed and cargo container.

Specifically, 9.1 shows a location of the peg connection piece located on the platform structure that connects the replacement structure to the platform structure (unseen in this image), 9.2 shows an example of a connection device, in this case an interlocking bar connection mechanism located on the underside of the platform structure, 9.3 shows an example of a replacement structure, in this case a medical evacuation bed, and 9.4 shows an example of a second replacement structure, in this case a cargo module.

Figure 10:
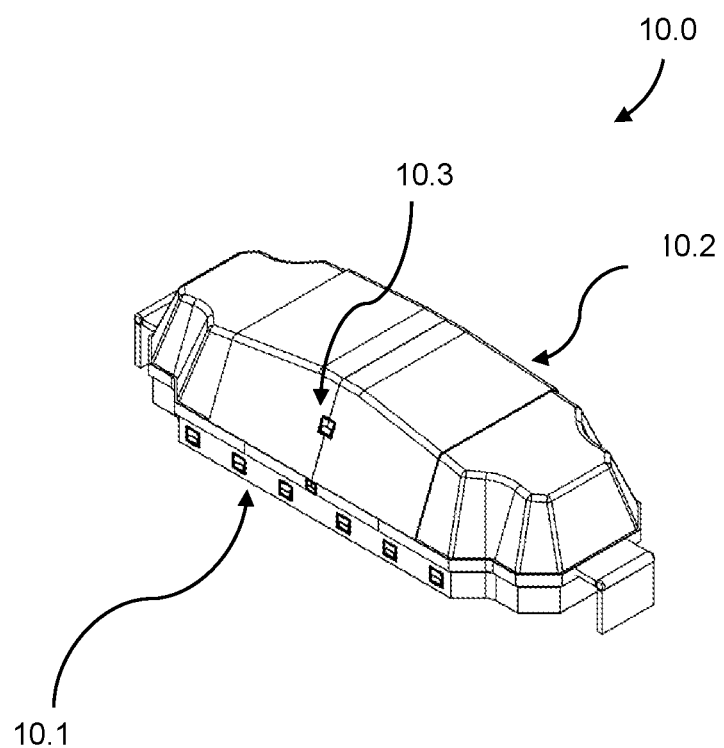
FIG. 10 shows a view of a replacement module, in this case a cargo bed with sliding and folding cover, which may be a modular addition to a top of a vehicle.

FIG. 10 shows a view of an example of a replacement module 10.0, in this case a cargo bed with sliding and folding cover, which may be a modular addition to a top of a vehicle; a cargo container or cargo bed may fit on a top or another location of a structure, in this case VTOL flight vehicle, it may rotate in a manner like a medical bed attachment, where its ability to rotate is a unique and intentional design choice affording specific capabilities.

10.1 shows a cargo storage area, 10.2 shows a sliding, folding cargo cover, and 10.3 shows a quick release, release or auto release latch, apparatus switch or lever.

Figure 11:
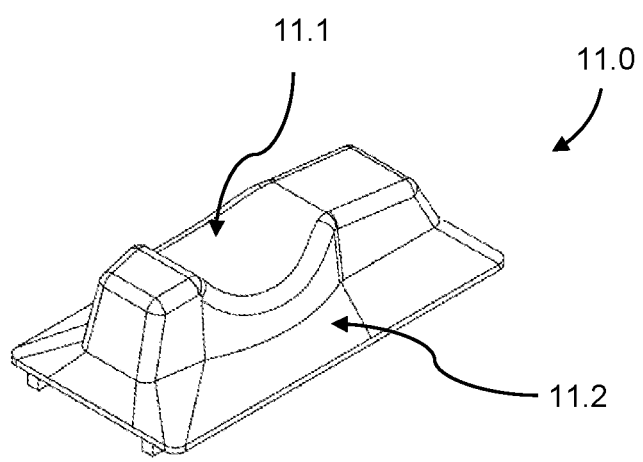
FIG. 11 shows a view of a seat which may be a modular attachment to a vehicle, and may include sensors.

FIG. 11 shows a view of a seat 11.0 which may be a modular attachment to a vehicle, where a seat area is included with a hinge area, and the seat detects a tilt of a passive rider.

11.1 shows a seat area, and 11.2 shows a tilting measurement capability in or under seat, or an area with sensors, as part of an attachment module.

Figure 12:
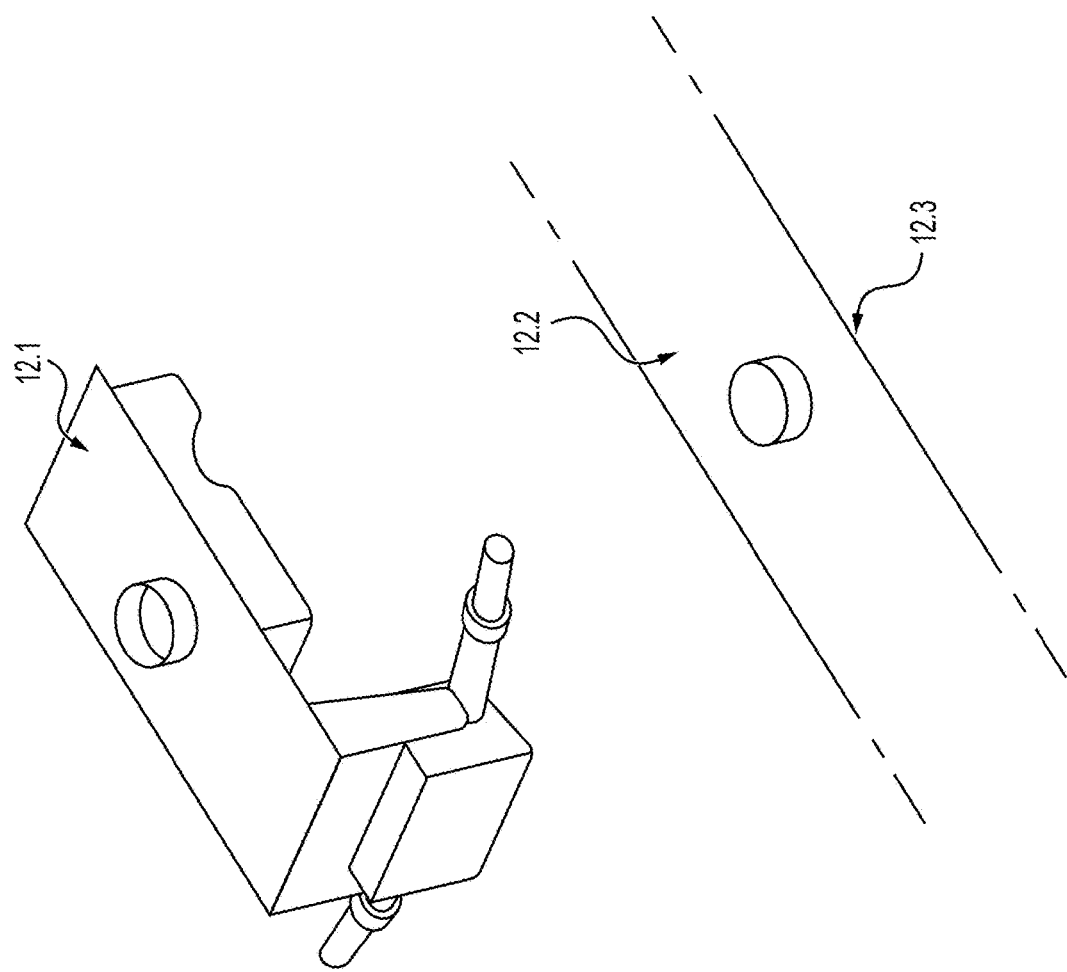
FIG. 12 shows a single point elliptical or circular modular attachment mechanism, shown on a bottom of a seat and a structure to which the seat may attach.

FIG. 12 shows a single point elliptical modular attachment mechanism 12.1 where an elliptical shape on a modular attachment may fit within or around an elliptical adaptor on a structure or vehicle, a seat attachment example module is shown upside down to highlight the attachment mechanism.

12.1 shows an elliptical connector apparatus on replacement module, 12.2 shows an elliptical connector apparatus on platform structure, and 12.3 shows a main structure, may be a top or part of a flight vehicle, vehicle, exoskeleton, or structure.

Figure 13:
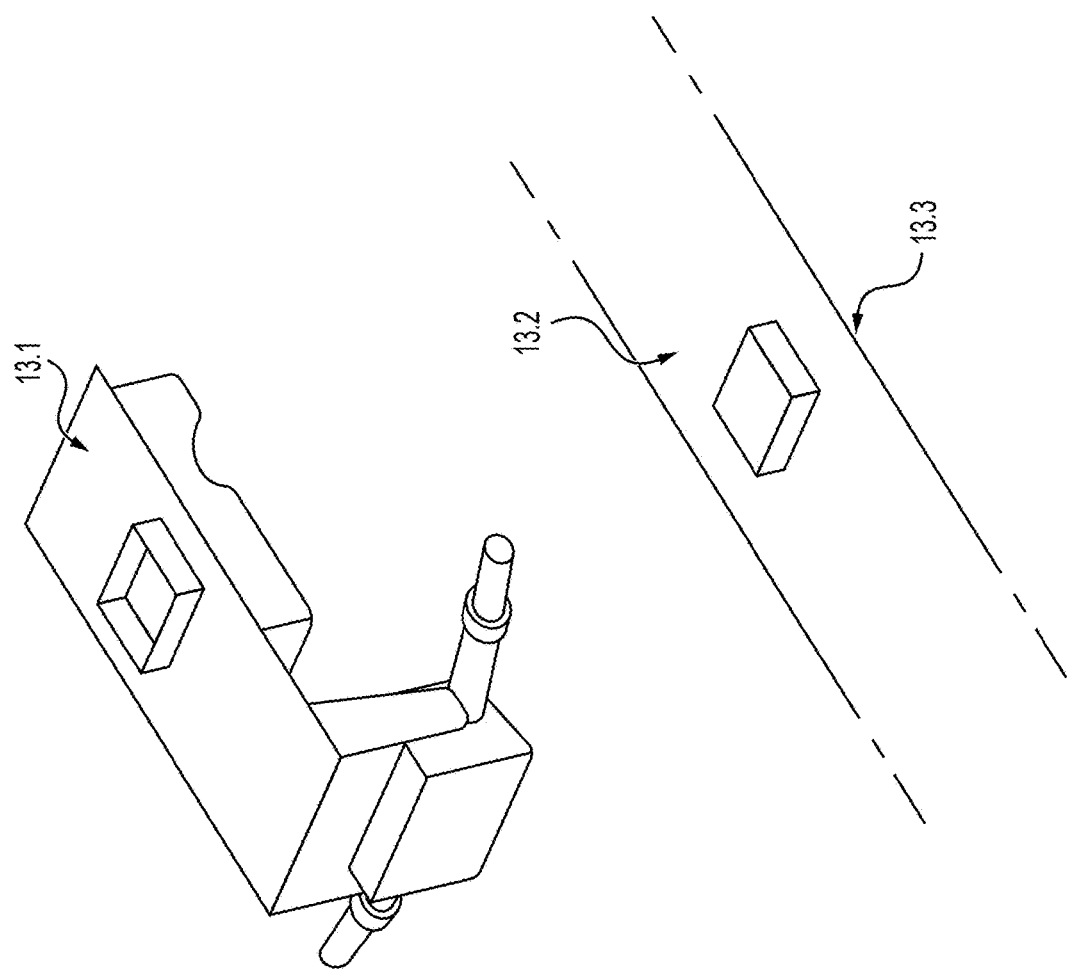
FIG. 13 shows a single point rectangular modular attachment mechanism, shown on a bottom of a seat and a structure to which the seat may attach.

FIG. 13 shows a single point rectangular modular attachment mechanism 13.1 where a rectangular shape on a modular attachment may fit within or around a rectangular adaptor on a structure or vehicle, a seat attachment example module is shown upside down to highlight the attachment mechanism.

13.1 shows a rectangular connector apparatus on replacement module, 13.2 shows a rectangular connector apparatus on platform structure, and 13.3 shows a main structure, may be a top or part of a flight vehicle, vehicle, exoskeleton, or structure.

Figure 14:
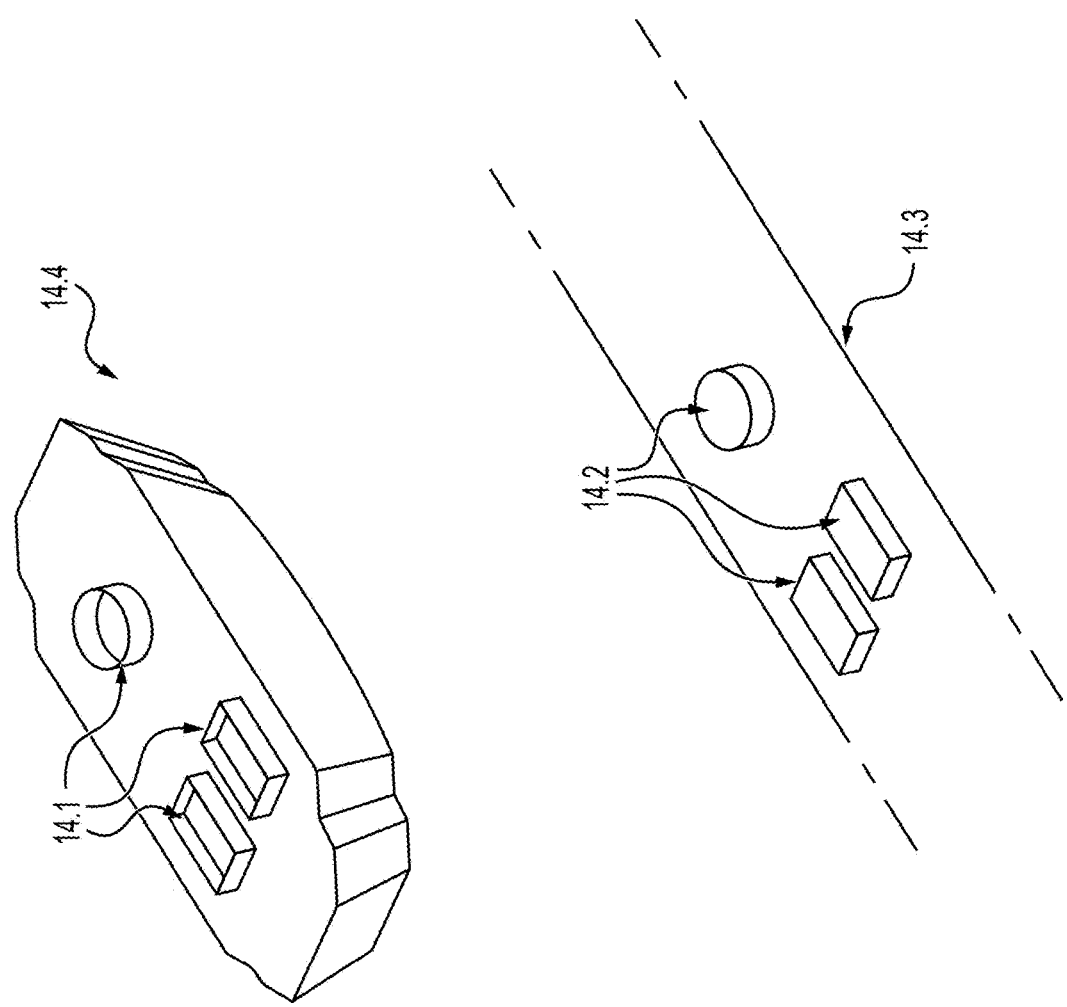
FIG. 14 shows a multi-point of connection elliptical and rectangular modular attachment mechanism where an elliptical shape and multiple rectangular shapes on a modular attachment may attach a modular attachment to a structure.

FIG. 14 shows a multi-point of connection elliptical and rectangular modular attachment mechanism 14.1 where an elliptical shape and multiple rectangular shapes on a modular attachment may fit within or around a rectangular adaptor on a structure or vehicle, a medical bed with open sliding cover attachment example module is shown upside down to highlight the attachment mechanism; multiple points may be used, as the use of multiple points, instead of a single point, may confer specific benefits in some instances.

14.1 shows a multi-point connector apparatus on replacement module, 14.2 shows a multi-point connector apparatus on platform structure, 14.3 shows a main structure, which may be a top or part of a flight vehicle, vehicle, exoskeleton, or structure, and 14.4 shows a medical bed with sliding and or rotating cover.

Figure 15:
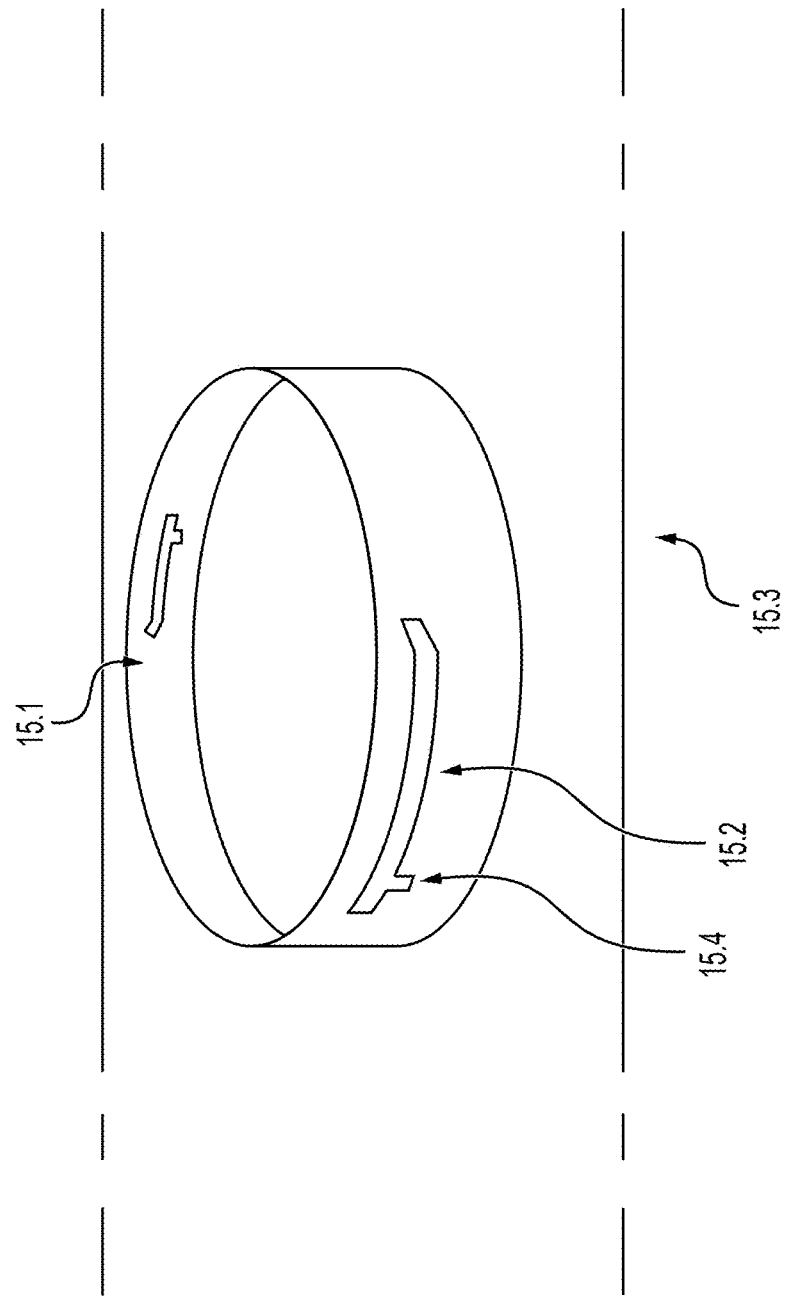
FIG. 15 shows an elliptical attachment mechanism with a slot for an elliptical mechanism with pin on attachment module may connect and lock into place.

FIG. 15 shows an elliptical attachment mechanism 15.1 with a slot for elliptical mechanism with pin on attachment module may connect and lock into place, locking pin connections are in indentations in slot-in space on elliptical connector on structure or vehicle.

15.1 shows an elliptical connection mechanism, with slot for locking, spring locking or otherwise connection pin or dowel, 15.2 shows a slot or space for connection pin, 15.3 shows a platform structure, which may be a top or part of a flight vehicle, vehicle, exoskeleton, or structure, and 15.4 shows a locking indent or location for security, may be quick release enabled.

Figure 16:
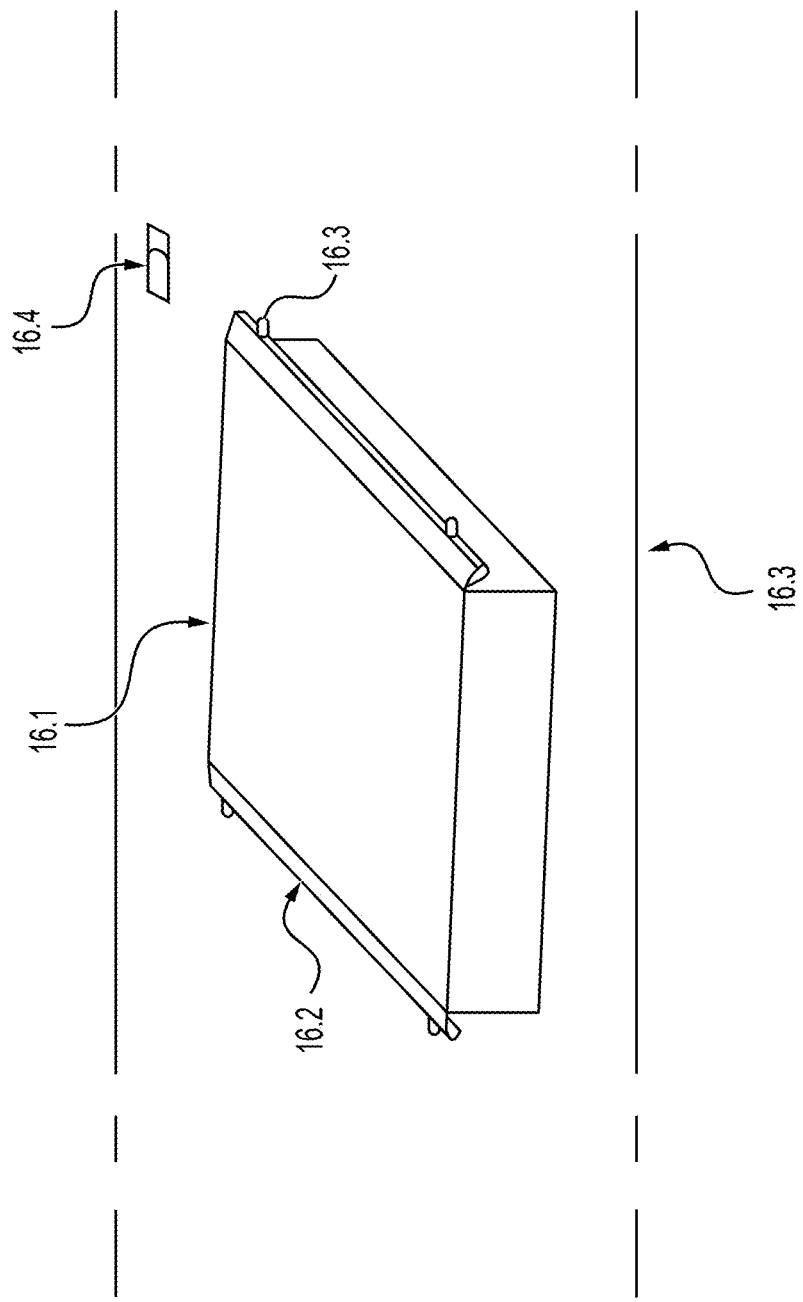
FIG. 16 shows a rail slide-in mechanism, with locking clips which may also be quick release unlocking clips to enable by quick release lever.

FIG. 16 shows a rail slide-in mechanism 16.1, with locking clips which may also be quick release unlocking clips enable by quick release lever.

16.1 shows a rail enabled or sliding or wheel enabled slide-on type connection, 16.2 shows rails or sliders for sliding, wheels or otherwise, 16.3 shows a platform structure, which may be a top or part of a flight vehicle, vehicle, exoskeleton, or structure, and 16.4 shows a quick release latch, switch, sensor to detect emergency for quick release, or any auto release.

Figure 17:
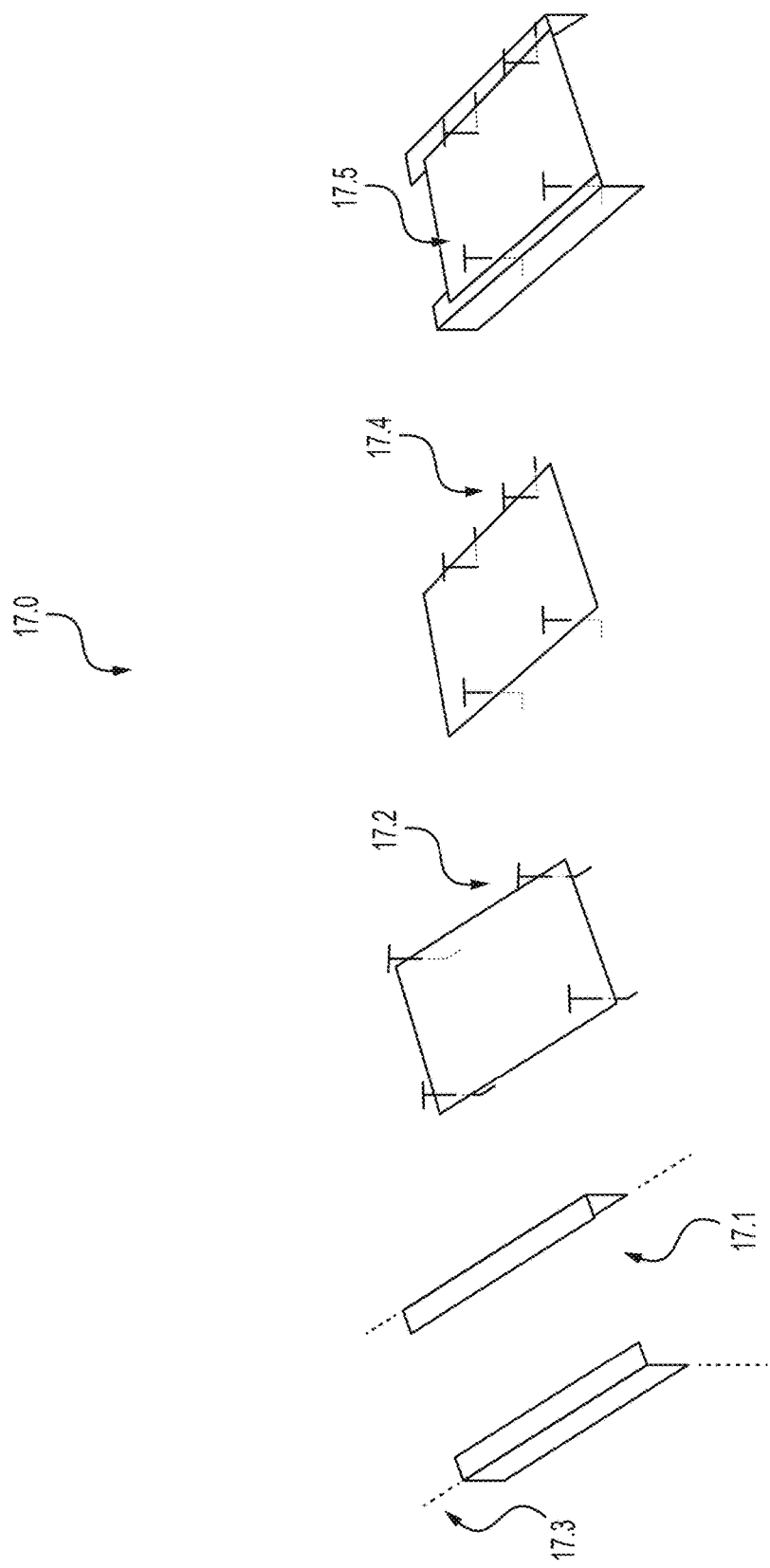
FIG. 17 shows a rotating clip attachment mechanism, where rails or structural elements on a vehicle or structure have a lip, and clips, clasps or hooks on a modular apparatus or a structure rotate to secure a connection.

FIG. 17 shows a rotating clip attachment mechanism, where rails or structural elements on a vehicle or structure have a lip, and clips, clasps or hooks on a modular apparatus rotate, or connect, and achieve a securement to a structure of vehicle by supporting under a lip.

17.1 shows rails or structural element with a lip, or a portion of structure or apparatus where a clip or clasp may connect, 17.2 shows rotating or clipping or clasping apparatus that secures beneath, behind, through or using a lip or lip type location on a main structure, 17.3 shows a main structure, which may be a top or part of a flight vehicle, vehicle, exoskeleton or structure, 17.4 shows an example of rotated rotating or clipping or clasping apparatus that secures beneath, behind, through or using a lip or lip type location on a main structure, to show position after a rotation, or connect-to-main-structure enabling adjustment, and 17.5 shows an example of a replacement module affixed to platform structure.

Figure 18:
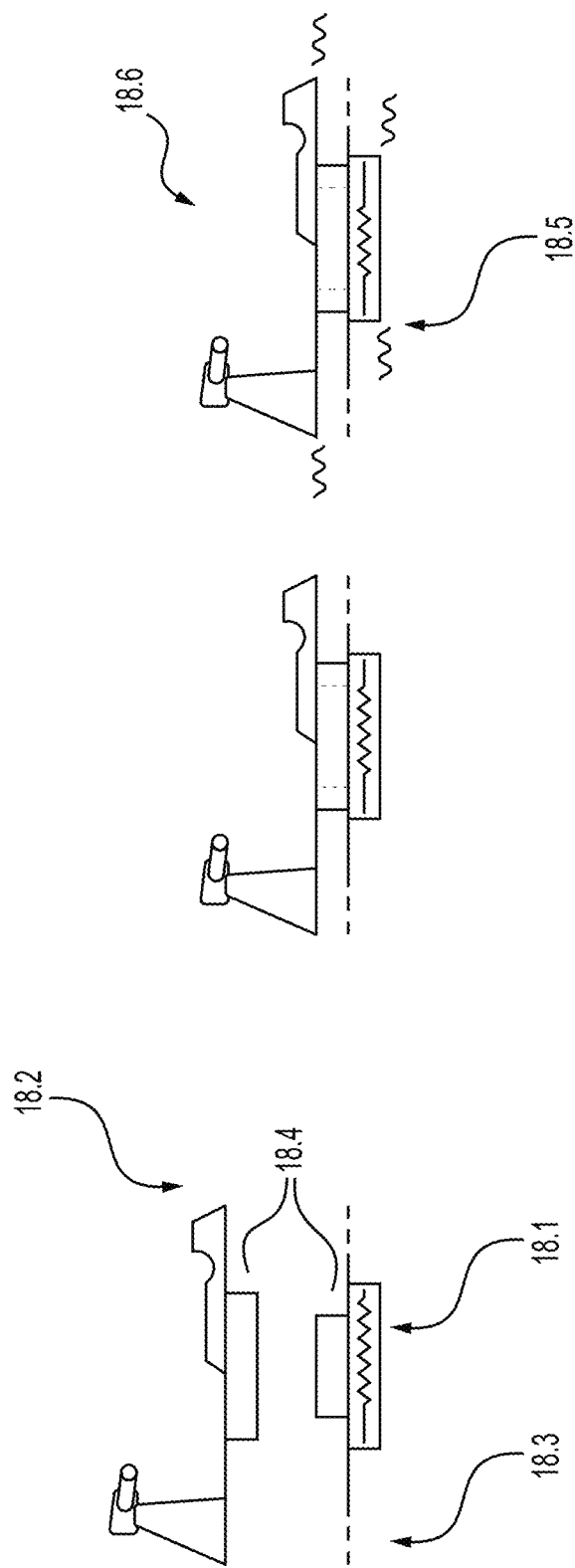
FIG. 18 shows an embodiment where an electromagnet is used to secure a modular attachment to a structure of vehicle, where a seat type of modular attachment is shown, and an electromagnet is powered to create a secure connection.

FIG. 18 shows an embodiment where an electromagnet is used to secure a modular attachment to a structure of vehicle, where a seat type of modular attachment is shown, and an electromagnet is powered once a mechanical connection mechanism on one structure fits around a mechanical mechanism on another structure, and then powered electromagnet holds it to a main structure (in other embodiments, it may hold it in place, fixed in place, above or not touching a main structure).

18.1 shows an electromagnet, may be on platform structure, replacement module or in attachment apparatus, 18.2 shows a seat type example of replacement module, 18.3 shows a platform structure, which may be a top or part of a flight vehicle, vehicle, exoskeleton or structure, 18.4 shows a mechanical structural elements to enhance connection, may be included with electromagnet, other mechanical structures may also be used along with electromagnet or other electromagnetic wave based measures, 18.5 shows an electromagnet that is 'on' or engaged, and 18.6 shows a replacement module that is securely attached or connected with platform structure 18.3.

Figure 19:
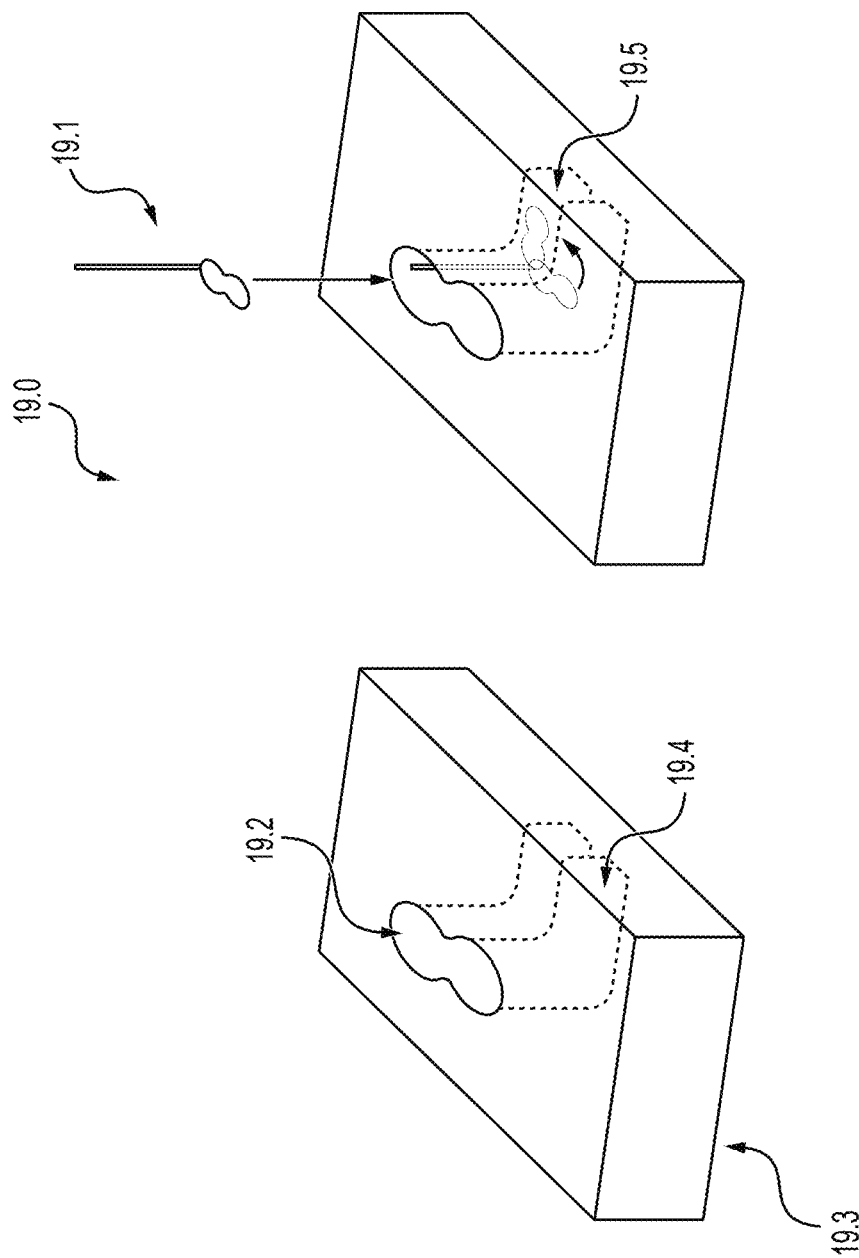
FIG. 19 shows a foot-shaped-and-rotate attachment mechanism for a modular structure, where a symmetrical or asymmetrical foot shaped structure may be used.

FIG. 19 shows a foot-shaped-and-rotate attachment mechanism 19.0 for a modular structure, where a symmetrical or asymmetrical foot shaped structure may be inserted into a locking structure and rotated.

19.1 shows a foot-type, or asymmetrical or symmetrical shape connector piece, 19.2 shows an opening for foot-type connection piece, 19.3 shows a platform structure, may be a top or part of a flight vehicle, vehicle, exoskeleton or structure, 19.4 shows a space inside of connection piece for foot-connection to rotate and secure connection, springs or other devices may be inside of this, and 19.5 shows a foot-type device rotated and secure.

Figure 20:
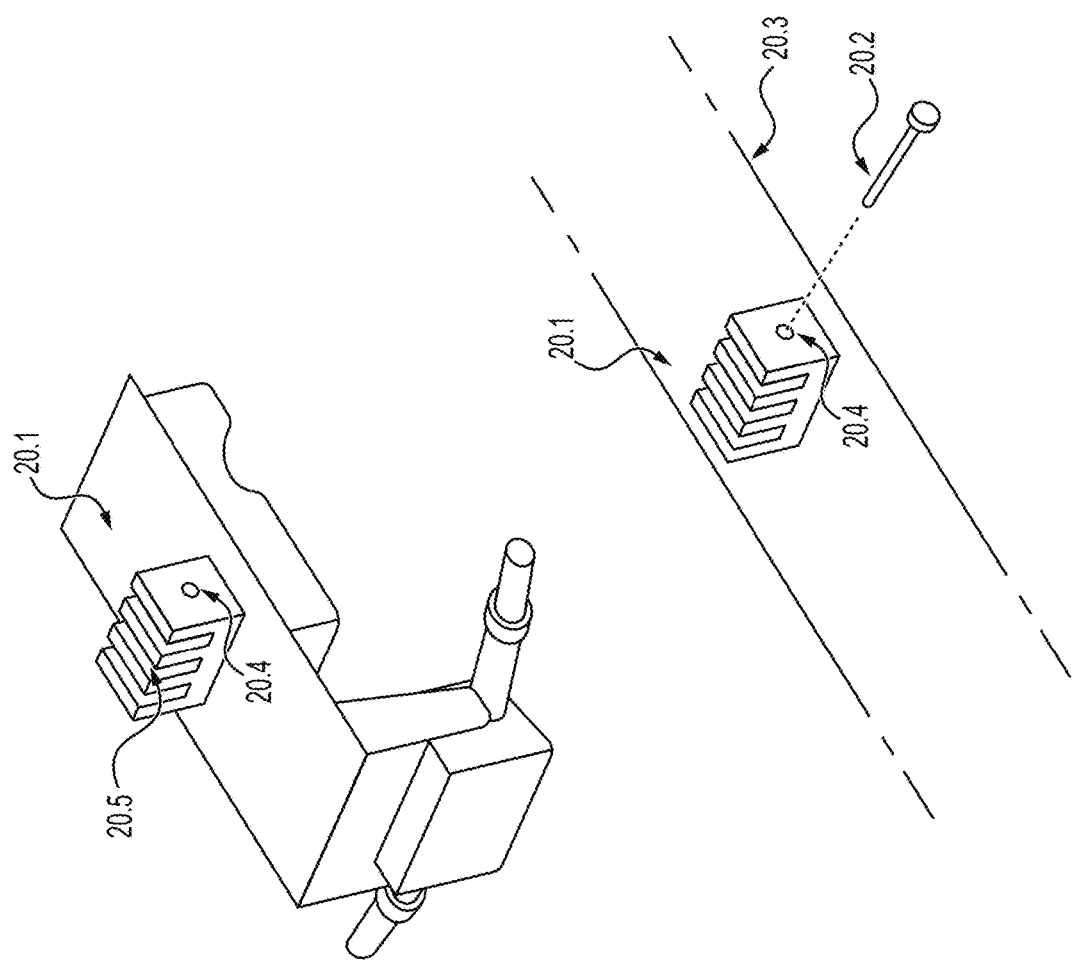
FIG. 20 shows a butterfly shape based mechanical sliding mechanism with locking insertion pin or dowel to secure a connection, a seat modular attachment is shown.

FIG. 20 shows a butterfly type, shape based mechanical sliding mechanism 20.1 with locking insertion pin or dowel, a seat attachment example module is shown upside down to highlight the attachment mechanism.

20.1 shows a butterfly type, or mechanical or slotted, shaped or fitting-together structure for connection, 20.2 shows a dowel or pin that may lock a connection in place, 20.3 shows a platform structure, which may be a top or part of a flight vehicle, vehicle, exoskeleton or structure, 20.4 shows a pin-hole or location for dowel to be inserted, which may go partly thought or fully though connection apparatus, and 20.5 shows a structural shape includes a shape that fits together in a particular way.

Figure 21:
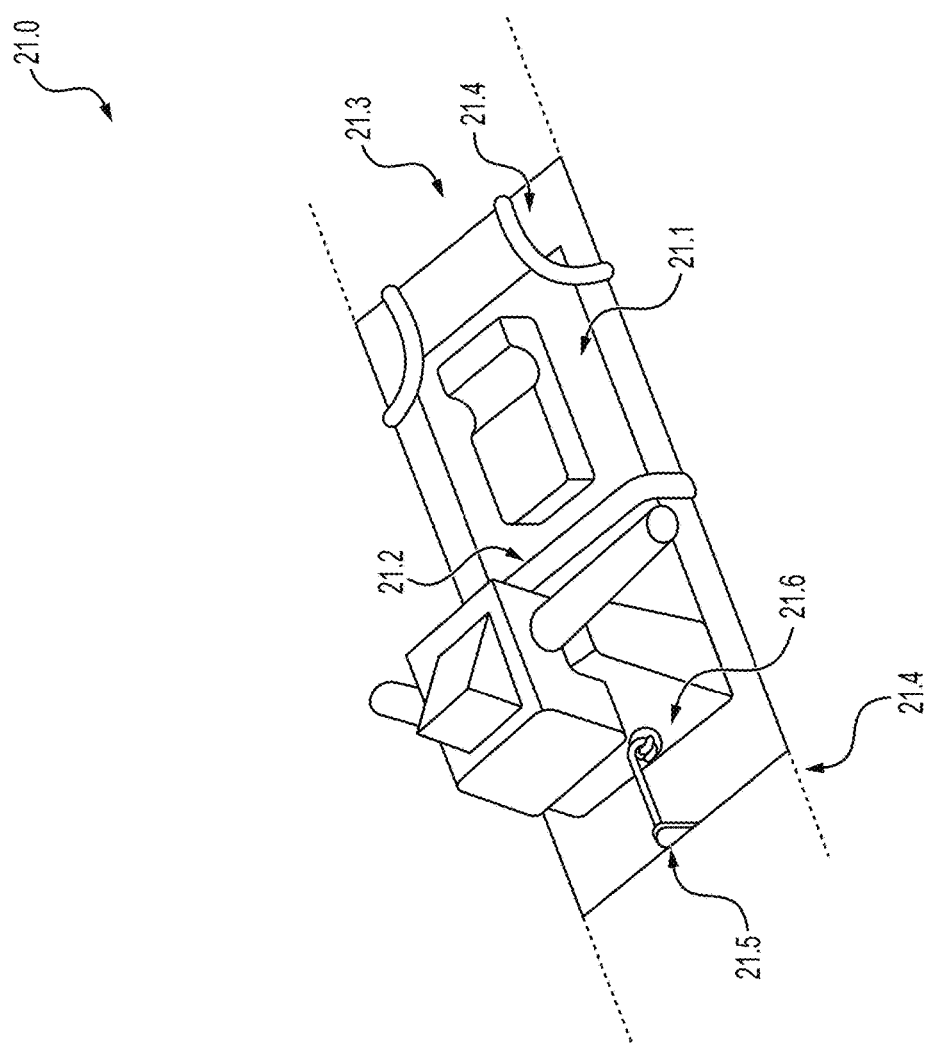
FIG. 21 shows a spring, chain, and clasp-able, rotating hook methodology of affixment of a modular attachment to a structure or vehicle, a seat attachment example module is shown.

FIG. 21 shows a spring, chain, and clasp-able, rotating hook methodology of affixment of a modular attachment to a structure or vehicle, a seat attachment example module is shown upside down to highlight the attachment mechanism.

21.1 shows an example replacement module, in this case a seat with manned flight controls, 21.2 shows a chain, cable or rope type replacement module, may tie above or below attachment module, or tie below module to hooks or structures as part of module, or connecting through various parts of module, 21.3 shows a platform structure, which may be a top or part of a flight vehicle, vehicle, exoskeleton or structure, 21.4 shows a spring, elastic, flexible or otherwise connection apparatus, 21.5 shows a hook connection apparatus, and 21.6 shows a location on replacement module where a hook may attach (hook and attachment point may be on replacement module or primary structure.

Figure 22:
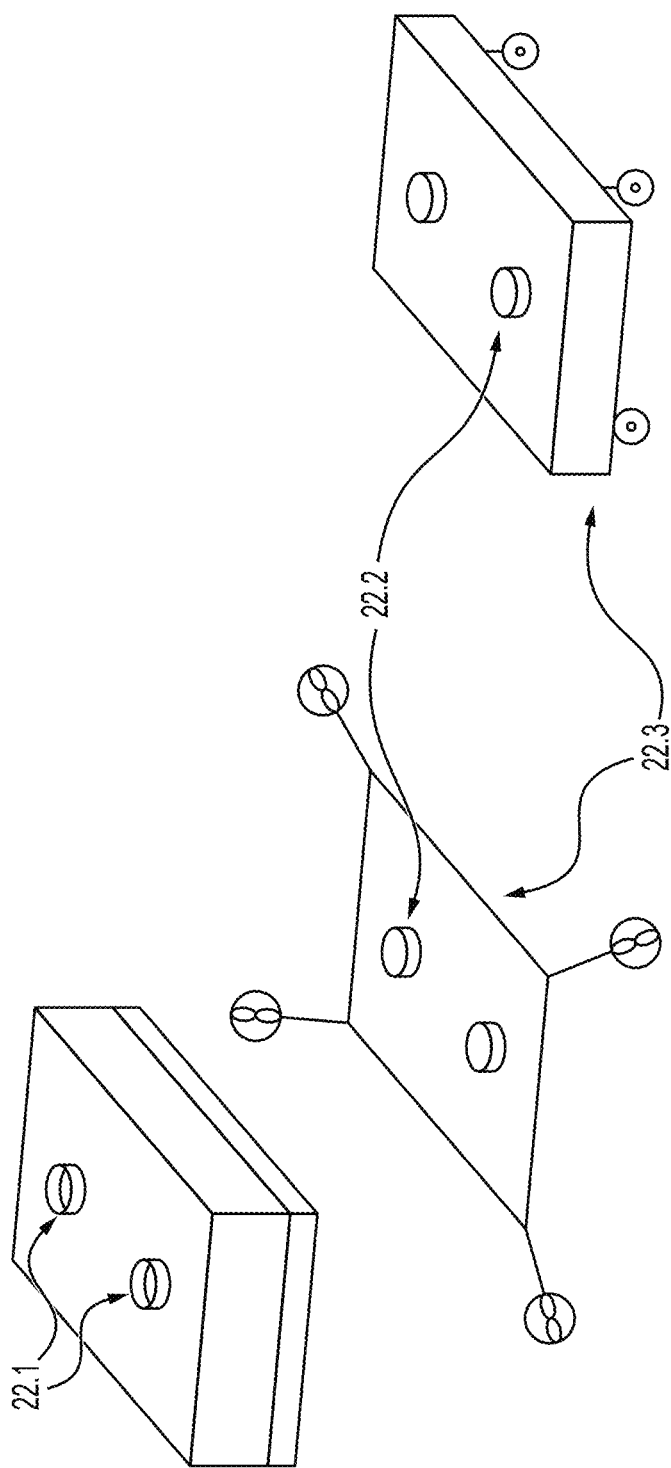
FIG. 22 shows a universally paired modular attachment with multiple points of connection, where universal pairing on multiple vehicles is capable and shown, a modular attachment cargo box is shown upside down and vehicles including a flight vehicle with propellers and a wheeled vehicle are shown.

FIG. 22 shows a universally paired modular attachment 22.1 with multiple points of connection, where universal pairing on multiple vehicles is capable and shown, where a modular attachment cargo box is shown upside to highlight the attachment mechanisms and vehicles including a flight vehicle with propellers and a wheeled vehicle are shown.

22.1 shows a universal connection apparatus, on replacement module, a case is shown where multiple connection points are used, 22.2 shows a universal connection apparatus connection point, on a platform structure, connecting apparatus connects to multiple universal connection apparatus points on different structures or vehicles, and 22.3 shows a platform structure, may be a top or part of a flight vehicle, vehicle, exoskeleton or structure, in this case a flight vehicle with propellers and a wheeled vehicle.

Figure 23:
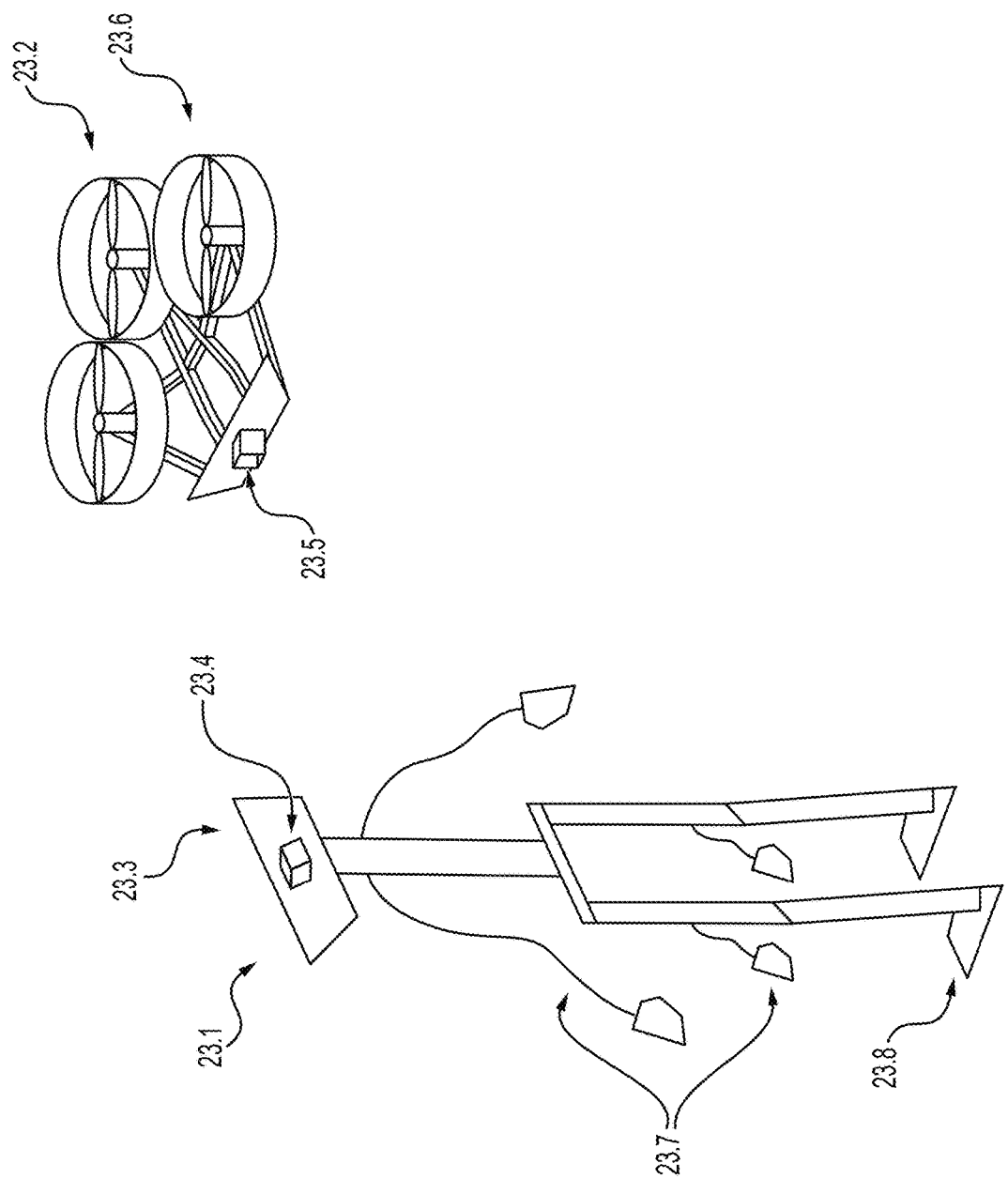
FIG. 23 shows an exoskeleton with a modular attachment flight enabling apparatus, including a rectangular attachment mechanism.

FIG. 23 shows an exoskeleton 23.1 with a modular attachment flight enabling apparatus, including a rectangular attachment mechanism. An exoskeleton suit may include a variety of form factors including different shapes and sizes and styles of exo-skeleton suits, all of these styles would still be encompassed in the present invention with the attachment of a flight enabling modular add-on as described in the present invention.

23.1 shows an exoskeleton suit, where a person stands in the suit and straps in; in this image and embodiment of the invention, this is an example of a platform structure, 23.2 shows a flight enabling replacement module, 23.3 shows a platform structure, may be a top or part of a flight vehicle, vehicle, exoskeleton or structure, in this case an exoskeleton, 23.4 shows a rectangular attachment apparatus on platform structure, 23.5 shows a rectangular attachment mechanism on flight enabling replacement module, 23.6 shows a propeller on flight enabling replacement module, could be other propulsive methodology, 23.7 shows straps where a user straps into the exoskeleton, and 23.8 shows foot stands on which a user stands when using the exoskeleton.

Figure 24:
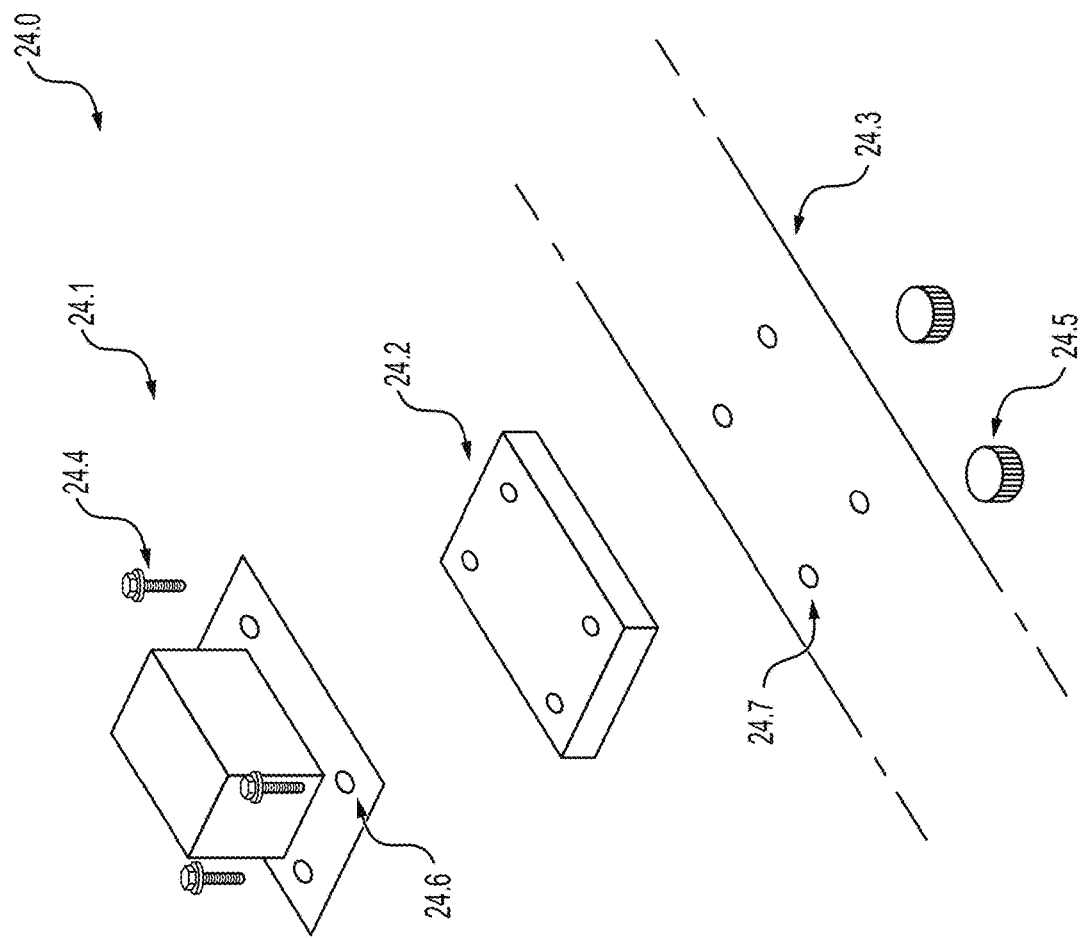
FIG. 24 shows a screw, bolt or thread based attachment method of a modular structure, including damping through a vibration absorbing material or apparatus.

FIG. 24 shows a screw, bolt or thread based attachment 24.0 of a modular structure, that include damping through a vibration absorbing material or apparatus.

24.1 shows the replacement module, 24.2 shows a damping mechanism, apparatus device or structure as part of damping-capable embodiment of the present invention, 24.3 shows a platform structure, may be a top or part of a flight vehicle, vehicle, exoskeleton or structure, 24.4 shows a thread or screw or bolt based attachment device, 24.5 shows a thread or nut or lock-nut or otherwise based attachment device, 24.6 shows a hole for thread based attachment, and 24.7 shows a hole for thread based attachment.

Figure 25:
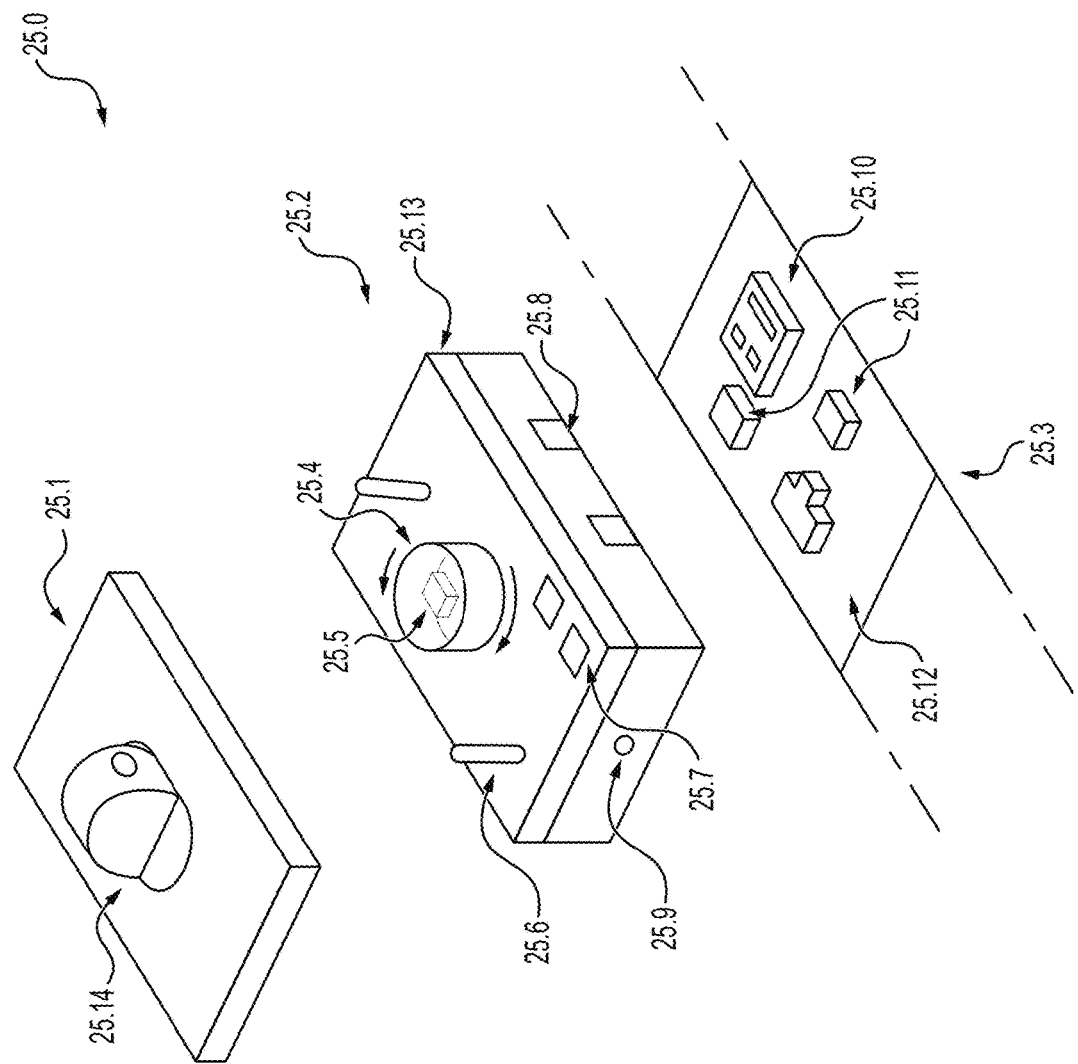
FIG. 25 shows an attachment module that includes auto-rotation, where censors in an attachment device recognize a direction or object, and auto rotate an attached module to maintain orientation or tracking; an attachment mechanism is shown using non-symmetric docking points, feeds of power, data and otherwise.

FIG. 25 shows an attachment module 25.0 that includes auto-rotation, where censors in an attachment device recognize a direction or object, and auto rotate an attached module, to maintain orientation or tracking; shown includes an attachment mechanism as including non-symmetric docking points, feeds of power, data and otherwise from a main structure to an attached module, and damping devices on a main structure, where attachment mechanism shown connects to a structure and to a mod that may be attached.

25.1 shows a replacement module that requires specific pointing a constant direction or moving target, 25.2 shows an attachment connection mechanism that accomplishes attaching the capability adding module or mod to a structure, vehicle or otherwise main structure, 25.3 shows a platform structure, may be a top or part of a flight vehicle, vehicle, exoskeleton or structure, 25.4 shows a rotate-and-lock attachment component, 25.5 shows a rectangular connection mechanism for attachment used concurrently, 25.6 shows a spring, piston, hydraulic or otherwise device for connection, control, damping, 25.7 shows power and or data and or otherwise feeds, 25.8 shows sensors that detect a moving object or constant orientation, 25.9 shows another sensor that may aid in aspects of tracking, orientation or otherwise, 25.10 shows a rectangular connection point between a platform structure and a replacement module, and a device that enables the attachment of a module, this with power feeds, 25.11 shows multiple damping support devices, 25.12 shows a non-symmetric, non-standard shape connection device, 25.13 shows a damping pad, plate, device or mechanical apparatus, and 25.14 shows equipment as part of a replacement module that benefits from constant orientation, tracking, moving or still object tracking or direction, may be a sensor that takes in information or a distribution portal that sends a signal or object or objects out.

An embodiment of the invention may include an automobile, truck, or recreational vehicles, or any other type of ground transport vehicle, acting as the platform structure, with various operating components acting as the replacement modules, including, but not limited to, a seat for a rider (FIG. 3, 3.1), various types of cargo containers (FIG. 4, 4.1, FIG. 10, 10.1), medical equipment or medical beds (FIG. 2, 2.1), firepower, robotic arms, water containers, fire extinguishing liquid containers, crop spraying devices, cameras or other imaging technology, or other devices is shown in the present invention.

An embodiment of the invention may include a rotary-wing aircraft, or rotorcraft, such as a helicopter, acting as the platform structure, with various operating components acting as the replacement modules, including, but not limited to, a seat for a rider (3.1), various types of cargo containers (4.1, 10.1), medical equipment or medical beds (2.1), firepower, robotic arms, water containers, fire extinguishing liquid containers, crop spraying devices, cameras or other imaging technology, or other devices is shown in the present invention.

An embodiment of the invention may include a fixed-wing aircraft, such as a jet engine or a turboprop airplane, acting as the platform structure, with various operating components acting as the replacement modules, including, but not limited to, a seat for a rider (3.1), various types of cargo containers (4.1, 10.1), medical equipment or medical beds (2.1), firepower, robotic arms, water containers, fire extinguishing liquid containers, crop spraying devices, cameras or other imaging technology, or other devices is shown in the present invention.

An embodiment of the invention may include a vertical take-off and landing (VTOL) vehicle, acting as the platform structure, with various operating components acting as the replacement modules, including, but not limited to, a seat for a rider (3.1), various types of cargo containers (4.1, 10.1), medical equipment or medical beds (2.1), firepower, robotic arms, water containers, fire extinguishing liquid containers, crop spraying devices, cameras or other imaging technology, or other devices is shown in the present invention.

An embodiment of the invention may include an unmanned aerial system (UAS) or unmanned aerial vehicle (UAV), or any other type of remote or autonomous ground or flight vehicle, acting as the platform structure, with various operating components acting as the replacement modules, including, but not limited to, a seat for a rider (3.1), various types of cargo containers (4.1, 10.1), medical equipment or medical beds (2.1), firepower, robotic arms, water containers, fire extinguishing liquid containers, crop spraying devices, cameras or other imaging technology, or other devices is shown in the present invention.

As described in the present application, an apparatus that is a multi-rotorcraft flight vehicle may be rectangular or oblong in shape, where it is symmetric about exactly two axes perpendicular to each other, and its lengths along those axis are different, in the x-y plane, when viewed from above, where the multi-rotorcraft is configured such that the centers of each outer-most propeller cannot lie on the line of a circle, cannot be equidistant along the line of a single circle when viewed from above, and or the same circle when viewed from above; if they do lie on a line of the same circle, and they are roughly equidistant or equidistant from each other, the vehicle may be considered close to round or round or symmetric or non-rectangular, whereas if they are not equidistant from each other, or roughly equidistant from each other, the vehicle may still be rectangular. In alignment with the present invention, a multi-rotorcraft may have rectangular or oblong payload areas or containers or payload bays, such that the multi-rotorcraft is designed to accommodate multiple different modular attachments, wherein these modular attachments may often be connected in an area where a payload may also go if a modular attachment was not attached, and there may be connection apparatuses in areas where a payload may go if no modular-add on is present. These areas may also be rectangular and or oblong, and symmetric above exactly two axis, or roughly symmetric about exactly two axis, where one length along one of the axis is different than another length along these axis, where roughly symmetric entails excluding slight interruption in shape of the payload area, from small mechanical facets of a flight vehicle, payload area, and or structure and or frame and or attachment and or connection mechanisms, for modular add-ons and or payload area covers and or payload area cover clasps.

In an embodiment of an apparatus of the present invention, a platform structure may be a flight vehicle that is a vertical take-off and landing (VTOL) flight vehicle, and may be a multi-rotorcraft vertical take-off and landing flight vehicle, as in FIG. 1A and FIG. 1B. As in an apparatus of the present invention, a VTOL multi-rotorcraft may be designed to include one or more standard attachment mechanisms for modular add-on components, and it may be designed to fit multiple different modular add-on components; modular add-on components may be considered a payload, or payload attachments; they may be attached where a payload may be stored if no modular add-on was attached. A flight vehicle of the present invention may be made and built to have multiple capabilities and serve multiple use cases with the different modular add-on components. A flight vehicle may be designed to fit with multiple modular add-on components, and may have a shape to be able to support multiple modular add-on components. A multi-rotorcraft may be designed to fit cargo containers, seats, medical beds, particle and or package and or liquid distributions systems, and or other systems as described in the present invention. As such, in that a multi-rotorcraft may be designed to fit with multiple different modular add-on components, a multi-rotorcraft may be designed to be rectangular as in FIG. 1A, FIG. 1B, FIG. 5, FIG. 8, and FIG. 9.

The methodology of the present invention also include multi-rotorcraft flight vehicle designed to have capability adding modular add-on structures attached to it so the vehicle can have multiple capabilities and support multiple use cases through the attachment of modular add-on apparatuses, including any combination of one or more or all of where a flight vehicle may be of a horizontal orientation, in a manner such as a car, boat or motorcycle, and use propellers, jet thrusters, electromagnetic thrust elements, wings or other thrust or lift generating devices or where a flight vehicle may be in a vertical orientation, in the nature of a flying exoskeleton, or scooter, or a device where a person stands on it, for example a skateboard, or a wheeled gyroscopic sensor enabled vehicle upon which a person stands, and use propellers, jet thrusters, electromagnetic thrust elements, wings or other thrust or lift generating devices, where replacement-modules include at least one of a medical bed, seat for an active pilot, a seat for a passive rider, a cargo hold or cargo container, mechanical apparatus that propels other mechanical objects or other objects in a direction at a rate or a laser or other electromagnetic based energy in a direction with a power or at a rate, or a water cannon or other liquid disbursal system which may be for extinguishing fires or other purposes, or robotic arms or buckets, or pre-packaged aid deliver devices of items, or other items, where a flight vehicle is rectangular or oblong (to enable multiple and different modular attachments and functionalities), where a multi-rotorcraft flight vehicle is not symmetric about more than two axis at right angles with each other, from a birds-eye-view, from looking from above, in the x-y plane, where a multi-rotorcraft flight vehicle is not symmetric about more than two axis at right angles with each other, and those two axis do not have the same symmetry, that is, the length of one axis is not the same as the length of the other axis, where a flight vehicle is rectangular such that it can accommodate modular add-on structures of multiple shapes and capabilities, including but not limited to any combination of at least one of seat, medical bed, cargo container, packet distribution systems, other modular add-ons of multiple shapes, where a flight vehicle adjusts it functionality with different modular add-on structures, where a flight vehicle adjusts its control system to accommodate different modular add-on structures, functions, capabilities, where a flight vehicle receives at least one of control or control function or control system updates from at least one of a modular add-on or a modular add-on connection device, where a flight vehicle has an adaptive control system, and where a connection of a replacement module onto flight vehicle at least one of serves a purpose or provides a capability including at least one of all sources of vehicle control, maneuverability.

In accordance with the method and apparatus that is a flight vehicle in the present invention, the present invention includes multi-rotorcraft flight vehicle to which modular add-on structures can be attached, including any combination of one or more or all of when a flight vehicle is a multi-rotorcraft where modular add-ons may be connected that at least one of add, change, adjust, enhance at least one of its capabilities, functionality, includes one or more standardized connection devices for modular add-ons on at least one of a top, side, bottom allowing at least one modular add-on to be attached at a time, where vehicle is at least one of autonomous, piloted, remotely piloted or any combination thereof, is a multi-rotorcraft flight vehicle with 6 propellers as in FIG. 1A, FIG. 1B, FIG. 5, FIG. 8, and FIG. 9, where the flight vehicle may be a rectangular or oblong shaped multi-rotorcraft, where the length of the vehicle along one major axis is not the same as the length of the vehicle along a second major axis when viewed from above, from a birds-eye perspective, where major axis are the longest axes (to enable multiple and different modular attachments and functionalities), where a multi-rotorcraft flight vehicle is not symmetric about more than two axis at right angles with each other, in the x-y plane, as in when viewed from a birds-eye view, and the length of one axis is not the same as the length of the other axis, and where a flight vehicle is rectangular such that it can accommodate modular add-on structures of multiple shapes, sizes and capabilities, including but not limited to any combination of at least one of seat, medical bed, cargo container, packet distribution systems, other modular add-ons of multiple shapes.

Furthermore, an apparatus of the present invention includes a multi-rotorcraft including any combination of one or more or all of where modular add-on attachments change the functionality of the vehicle by adding structural capabilities, including any of a seat, medical bed, cargo container, packet distributor, liquid distributor energy distributor, aid distributor, or any combination thereof, where modular add-on attachments change the functionality of the vehicle by adding non-hardware capabilities including control, control function, power, data, signal, information, or any combination thereof, where modular add-on attachments change the functionality of the vehicle, that changes some of at least one of its functionality and capabilities with different modular add-on structures, that adjusts its control system to accommodate at least one of different modular add-on structures, functions, capabilities, where a flight vehicle receives at least one of control or control function or control system updates from at least one of a modular add-on or a modular add-on connection device, that at least one of has an adaptive control system, uses an adaptive control system, where an adaptive control system adjusts for different flight vehicle configurations including at least one of different modular add-ons, different uses, different functions, different capabilities, where a connection of a modular add-on on for a flight vehicle at least one of serves a purpose or provides a capability including at least one of all sources of vehicle control, maneuverability, where a connection apparatus includes control functions, control signals, communication to motor and thrust controls, navigation and GPS information, and any other connection or information for or from the modular add-on, where the vehicle receives at least one of control functions, control signals, communication to at least one of motor and thrust controls, at least one of navigation and GPS information, from at least one of one or more of the connection apparatus, or from modular add-ons, or any combination thereof, and where signals, control functions, control signals, communication to motor and thrust controls, navigation and GPS information come from a modular add-on.

In order to support different modular add-ons in accordance with an apparatus of the present invention, a multi-rotorcraft may be rectangular such that a medical bed may fit on it, other cargo containers of certain shapes may fit on it, seats may fit on it, or any modular add-on and or capability adding modular add-on and or use case enabling modular add-on, including power, data, aid, cargo packet, control, control system, control function, electromagnetic wave transmitting, or otherwise modular add-ons.

Likewise, in accordance with the an apparatus of the present invention, a multi-rotorcraft may be rectangular as in FIG. 1A, FIG. 1B, FIG. 5, FIG. 8, and FIG. 9, so that it can support multiple uses as within the present invention, and to support multiple different use cases and multiple different modular add-ons in accordance with the present invention, a multi-rotorcraft may be symmetric about two axis from above, when looking down from above, or described as per a birds-eye-view as it is typically used; a multi-rotorcraft may be rectangular or oblong as in FIG. 1A, FIG. 1B, FIG. 5, FIG. 8, and FIG. 9, and as in FIG. 1A, FIG. 1B, FIG. 5, FIG. 8, and FIG. 9, it may be asymmetric about more than two axis from above, it may symmetric about exactly two axis from above, it's symmetry about those two axis may be different in that it may be rectangular or oblong instead of square or round or rounded, it may be entirely asymmetric. A flight vehicle may use the methodology of the present invention while being symmetric about every axis or infinite axis when viewed from above, also known as a circle, or it also may be a square, or another shape. In accordance with an apparatus of the present invention, a structure that support multiple use adding modular add-ons through a plurality of standardized connection modules may be a flight vehicle that is a multi-rotorcraft, and in accordance with an apparatus of the present invention, the multi-rotorcraft may support multiple modular add-ons or modular additions, and multiple use cases, and fit with multiple capability adding modular add-ons, and be designed to support these add-ons, and be six propeller multi-rotorcraft as in FIG. 1A, FIG. 1B, FIG. 5, FIG. 8, and FIG. 9, and be rectangular or oblong, as in FIG. 1A, FIG. 1B, FIG. 5, FIG. 8, and FIG. 9, and may be symmetric about exactly two axis when viewed from above, where it's symmetry about those two axis may be different in that it doesn't have the same symmetry about those two different axis, and it may be rectangular or oblong as in the present invention and shown in FIG. 1A, FIG. 1B, FIG. 8, and FIG. 9.

In accordance with an apparatus of the present invention where a flight vehicle may be a multi-rotorcraft that is rectangular or oblong, it may be symmetric along two axis that are at right angles to each other, and it may be such that the symmetries are different, i.e. the lengths of the flight vehicle along those two axis are different. It may also be that the propellers have different numbers of blades or are different sizes, and it may still be of a rectangular shape such that it is explicitly covered in the present invention, as in FIG. 1A, FIG. 1B, FIG. 5, FIG. 8, and FIG. 9. Symmetry may be about a major axis and a second major axis, where these major axes are along the longest and second longest length of a flight vehicle, when looking down from above, as in an x-y plane, as in a birds-eye-view; in some cases, based on propeller positioning, major axes may not strictly be along the two longest dimensions of the flight vehicle, but may be along the two dimensions of a rectangular body or the longest dimensions of an oblong body or frame or main frame or payload carrying area of a flight vehicle, or may be based on the locations of the centers of the propellers. Furthermore, a description of a rectangular or oblong flight vehicle as covered in the present invention, along with being symmetric about exactly two axis at right angles with each other or perpendicular with each other may be described as a flight vehicle where a single circle shape cannot pass through the center of each propeller with the centers of the propellers being equidistant from each other or roughly equidistant from each other, (also including the outer-most propellers if a vehicle has many propellers that don't just form the outside of a shape but include many propellers in between each other), but only an oblong circular shape such as an ellipse could pass through the centers of each propeller; for example, a circle may pass through each vertices of a triangle, a square, a pentagon, a hectogon, a heptagon, an octagon, etc. As such, a vehicle with propellers where their centers can lie along by a circle is not rectangular or oblong. For example in FIG. 1A, FIG. 1B, FIG. 5, FIG. 8, and FIG. 9, an oblong shape such as a form of an ellipse may pass through the centers of each of the propellers, however a single circle could not. If, as in FIG. 1A, FIG. 1B, FIG. 5, FIG. 8, and FIG. 9, the 3 propellers at either end were positioned such that a single large circle could pass through all of them, the vehicle would still be considered oblong under the current description, as the centers of the propellers along the circle would be highly non-equidistant from each other. Furthermore, the vehicle in FIG. 1A, FIG. 1B, FIG. 5, FIG. 8, and FIG. 9 has a rectangular or oblong frame, structure, or main frame area, as well as a rectangular payload area, and is longer in one major axis than a second major axis, and so is classified as rectangular in all of those manners.

A vehicle may be considered rectangular or oblong if it meets any one of or multiple of or every of rectangular or oblong outer dimensions, frame, body, main frame, payload area, and symmetric about exactly two axes or major axes as explained within the present invention, and centers of propellers or outermost propellers lie along a circle and are equidistant or roughly equidistant, and standard to the field of practice of expert or engineering judgement that a vehicle is rectangular or oblong; explanations of symmetry here and elsewhere are when viewed from above, such as a birds-eye-view, also as in the x-y plane of the flight vehicle while it is horizontal, in its hover flight position or in its forward flight position. In cases where odd numbers of propellers are used, a flight vehicle may be roughly symmetric about every axis, instead of exactly symmetric about more than two axis and be considered non-rectangular in the present definition, also by the other test methods as in lengths of axes and the centers of the propellers lie on a circle.

For example of symmetry and a rectangular or oblong flight vehicle, the 3 propellers on the flight vehicle in FIG. 1A at one end of the flight vehicle are symmetric to the 3 propellers at the other end, when reflected over a middle-line or mid-point line of the flight vehicle that is perpendicular to the length of the flight vehicle along its longest axis. Likewise, the flight vehicle in FIG. 1A is symmetric about the axis going down the length of the flight vehicle, the line going from the midpoint of the locations of the two propellers centered among the three propellers at either end of the flight vehicle. As such, the flight vehicle in FIG. 1A, FIG. 1B, FIG. 5, FIG. 8, and FIG. 9 are symmetric about exactly two axes, along the two major axes of the flight vehicle when viewed from above, and not about any other axes, when views from above. For example, the flight vehicle in FIG. 1A, FIG. 1B, FIG. 5, FIG. 8, and FIG. 9 is not symmetric about any line or axes except for the axis perpendicular to the its longest axis and exactly in the mid-point of this line, and the axis along the longest dimension of the flight vehicle, from the midpoints of the propellers centered along the rectangular body of the flight vehicle at either ends of the flight vehicle and centered between the other two motors at either end. Likewise, it is clear in FIG. 1A, FIG. 1B, FIG. 5, FIG. 8, and FIG. 9 that the major axis goes along the major dimensions of at least one of the rectangular body, rectangular frame, rectangular payload area, where the major dimensions of a rectangular area are the lines perpendicular to each side that cross in the middle or mid-point of the rectangle when viewed from above.

As a further example, a flight vehicle that is an octocopter, which is described typically and as used in the present explanation as a multi-rotorcraft flight vehicle with 8 propellers where all 8 of the propellers are equidistant from each other and oriented in a circular shape, or specifically an octagonal shape, is not rectangular or oblong, it is symmetric about more than two axes, the centers of the propellers all fall on a line of a circle when viewed from above, it has the same lengths along different axis, and it would be considered to roughly circular and not rectangular by anyone experienced in the field or with experience in geometry.

An apparatus of the present invention is not limited to only flight vehicles that are rectangular, but an apparatus of the present invention, the modular add-ons, the connection apparatuses and the flight vehicle and flight vehicle characteristics are still within the present invention if a flight vehicle is symmetric or round or rounded or square, or pentagon, hexagon, octagon or otherwise shaped.

As pictured in FIG. 1A, FIG. 1B, FIG. 5, FIG. 8, and FIG. 9, in accordance with an apparatus of the present invention, multi-rotorcraft may have six propellers, and they may be distributed with three on one side of a rectangular shape of a multi-rotorcraft flight vehicle and three on another side of a rectangular shape of a multi-rotorcraft flight vehicle. As in the present invention, a multi-rotorcraft flight vehicle may be designed to support multiple modular add-ons and use cases, and have a rectangular shape, and a multi-rotorcraft flight vehicle may have a rectangular area on top where a modular add-on may fit as shown in FIG. 1A, FIG. 1B, and FIG. 8, or on a side, or on a bottom as shown in FIG. 1A, FIG. 1B, and FIG. 8. In accordance with an apparatus of the present invention, a multi-rotorcraft may also have standardized connection mechanisms or ports on a top (1.1 and 8.1), and one or more connection ports may be at least one of inside or around a rectangular area on a top of a multi-rotorcraft (1.1 and 8.1); likewise in accordance with an apparatus of the present invention, a multi-rotorcraft may have one or more connection ports on a bottom (1.2 and 8.2), and one or more connection ports may be at least one of inside or around a rectangular area on a bottom of a multi-rotorcraft flight vehicle (1.2 and 8.2).

In accordance with an apparatus of the present invention where a structure that is a multi-rotorcraft flight vehicle may support different modular add-ons and change its capabilities and use cases with those different modular add-on structures, in order to accomplish the different functionalities of the modular add-on structures, a flight vehicle as shown in FIG. 1A, FIG. 5, FIG. 8 and FIG. 9 may fly differently with different modular add-ons, as it accomplished the different functionalities and capabilities of the different modular add-on structures. Likewise, as in an apparatus of the present invention, a vehicle may receive different vehicle controls, control functions, navigation, communication to motors/thrust, from or through at least one of a modular add-on, connection apparatus, flight vehicle adaption to modular add-on to support the capabilities of the attached modular add-on. In accordance with an apparatus of the present invention, a structure as part of the present invention that is a flight vehicle may adapt its control system to account for the attached modular add-on, in that as within the present invention a structure that may be a multi-rotorcraft flight vehicle is able to receive multiple different modular add-on structures and support different capabilities and functions of different modular add-on structures, and fly or deploy with different modular add-on structures, and is capable of accomplishing the different functions or capabilities of the different modular add-on structures through adaptive controls, adapting controls to at least one of varying use cases or needs for varying functions or capabilities or use cases, including relative to the modular add-on, including cargo or passengers or pilots in cargo beds, on seats or medical beds or otherwise.

In accordance with an apparatus of the present invention where a multi-rotorcraft flight vehicle may perform a use case, land, quickly swap modular add-ons modules using quick-release latches and capabilities, then quickly deploy and accomplish another use case based on its different capabilities and functionality with the replacement of the modular add-on, a multi-rotorcraft flight vehicle may land and then quickly take off again, and in accordance with an apparatus of the present invention to accomplish this method, it may be able to quickly deploy or launch and fly again, and in accordance with this it may have fast swapping batteries, power sources, plugs, that are accessible from the outside of the vehicle, as shown on the sides of a multi-rotorcraft flight vehicle in FIG. 1A, FIG. 5, FIG. 8 and FIG. 9. In accordance with an apparatus of the present invention, where modular add-ons and fast release and attachment connection apparatuses allow for quickly changing capabilities, and the methodologies and platform structures which may be a flight vehicle as described in the present invention provide the capabilities of an apparatus of the present invention, an embodiment of an apparatus of the present invention includes a flight vehicle or vehicle or structure that is able to quickly change modular add-on structures and quickly re-launch or re-deploy, and apply the capabilities of the attached replacement structure, and structures which may be a flight vehicle that include modular attachment connection apparatuses and support modular add-on replacement modules and enable the methodology of the present invention are covered in the present invention, fast exchangeable power systems as shown on the sides of a multi-rotorcraft in FIG. 1A, FIG. 5, FIG. 8 and FIG. 9 are within the methodology of the present invention.

Likewise, an apparatus of the present invention allows a flight vehicle to land and quickly change modular add-ons through quick release and attach connection apparatuses, and to quickly re-launch or re-deploy to employ the different capability or function of the added modular add-on, and the present invention includes a structure that may be a flight vehicle that is an apparatus of the present invention, and in so, in order to re-deploy or re-launch quickly and be able to perform the added capabilities of the added modular add-on, it includes fast swappable power for flight, enabling an apparatus of the present invention, a person must be able to switch the modular add-ons, and as shown in FIG. 1A, FIG. 5, FIG. 8 and FIG. 9, a multi-rotorcraft with propellers has shrouds that surround the outside edges of the propellers, in so that a person may safely approach the flight vehicle, so that the modular-add on attachments may be changed, so that a multi-rotorcraft structure as described in the present invention accomplishes the methodology of the present invention.

An embodiment of the present invention may include an exoskeleton or bodysuit, that may be considered a structure or vehicle or main structure, acting as the platform structure, and any of described or non-described connection modules, as described in the present invention, that may be added to an exoskeleton or otherwise acting as the replacement modules.

Figure 4B:
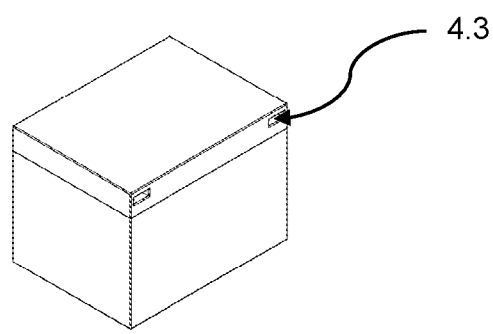
FIG. 4B shows a replacement structure, in this case a cargo module with quick release connection points.

As described, the replacement module may be separate from the vehicle, and may be square, rectangular, spherical, elliptical or otherwise shaped, or it may not be a standard shape in the case where it is a collection of structures connected together (metal or otherwise beams attached in a certain fashion that constitutes an own structure, but isn't a regularly defined shape) wherein the structure that is added may serve a purpose or provide a capability. An embodiment of the invention may include a medical bed as shown in FIG. 2, a seat for a rider with manned flight controls as shown in FIG. 3, various types of cargo containers as shown in FIG. 4, and FIG. 10. The added structure may also be something other than mentioned including, but not limited to, seats, medical beds, cargo containers, firepower, water cannons, emergency aid delivery packages and still be encompassed by the present invention.

In an example of a medical bed replacement module as shown in FIG. 2, there may be cushioning (2.4) or medical grade cushioning, there may be pillows (2.7) or medical pillows of stay-in-a-certain-position pillows, there may me movement restricting straps (2.5), there may be medical monitors, drips, power, defibrillator, or autonomous defibrillator and, or, other autonomous life support medical equipment (2.3).

In an example of a pilot seat replacement module as shown in FIG. 3, and FIG. 11, where a seat may include pilot body movement and or center of mass and or change in movement and or center of mass detection (11.2), and may include control handle bars, wheels, mechanisms, display screens, on/off switches, and other typical industry standard control modules (3.3).

In an example of a cargo container, that may be mounted to the top of a vehicle or structure as a replacement module as shown in FIG. 10, which may have auto-unload or dumping capabilities, which may include sensors to detect a shifting payload, which may have a cover that opens and closes or slides and or rotates (10.2), and may include fast release, release, and or auto release mechanisms (10.3) to deploy contents or a whole detachable cargo module (10.1).

In an example of a cargo container, that may be mounted to a bottom of a vehicle or structure as a replacement module as shown in FIG. 4, or elsewhere on the vehicle, that may have an auto-deploy cargo capability (4.3), or may be able to be fully loaded before being added to the vehicle as a module.

In an embodiment of the present invention where the platform structure is an exoskeleton or bodysuit (23.1), the attached replacement modules may have parachutes or their own flight enabling capabilities (23.6). These flight enabling replacement modules may allow the end user the ability to conduct manned, controlled flight. Another embodiment of a replacement module is the capability to discharge a parachute, or series of parachutes, in both an emergency or non-emergency situation, to enable the flight exoskeleton a safe landing.

In an embodiment of the present invention where the platform structure is an exoskeleton or bodysuit (23.1), the attached replacement modules may have the ability to perform flight or emergency landing capabilities, including, but not limited to, the ability to jettison the exoskeleton from the pilot and allow the pilot the ability to discharge a parachute, or series of parachutes, in both an emergency or non-emergency situation, to enable the flight exoskeleton a safe landing.

In an embodiment of the present invention where the platform structure is an exoskeleton or bodysuit (23.1), the attached replacement module may include propellers, rockets, propane or jet fuel or solid rocket motors or otherwise.

In an embodiment of the present invention where the platform structure is an exoskeleton or bodysuit (23.1), the attached replacement module may include the ability to conduct aerial crop spraying. The replacement module would include a liquid disbursement mechanism that would be attached to the underside of a vertical takeoff and landing vehicle (VTOL) that would allow for the disbursement of pesticide, seeds, water, or any other liquid or non-liquid substance.

In an embodiment of the method of the present invention, the methodology covers a multi-rotorcraft flight vehicle that has capability adding modular add-on structures attached to it so the vehicle can have multiple capabilities and support multiple use cases through the attachment of modular add-on apparatuses, including any combination of one or more or all of where flight vehicle is autonomous, optionally manned or remote piloted, where a user can seamlessly, quickly, easily change or replace replacement-modules on a flight vehicle, where replacement-modules add capabilities to the flight vehicle or change the capabilities of the flight vehicle, where replacement-modules change the functionality of the flight vehicle, where a standardized mechanical apparatus for connection of modular add-ons to a flight vehicle could occur in one or more locations on the flight vehicle which enables one or more replacement-modules to be added to a top, bottom, side, or other location on a flight vehicle one at a time or at once, where a vehicle could land, change replacement-modules, and re-deploy or re-launch with different functionality, and where aid packages may be stored in a flight vehicle or a replacement module, and fed to a replacement module or a second replacement module, and dropped, sent, shot out from or distributed to aid recipients.

Additionally, an embodiment of the method of the present invention covers a multi-rotorcraft including any combination of one or more or all of where distinct and different uses are enabled by the attachment of capability adding replacement modules, including crop dusting, all forms of cargo delivery, carrying toxic of nuclear waste, testing capability for soil, water, blood, and or other bodily or other materials for medical, environmental or other tests as required, surveying or monitoring large areas of territory, carrying of water or other anti-fire chemicals to serve as a fire deterrent, scouting or exploration capabilities for a variety of industries, ship to ship or ship to shore transportation of both personnel and/or cargo, including information or data, physical maintenance and/or monitoring of maintenance required including on or over land, sea or otherwise, use on Earth, underground, in space or outside of the Earth and the Earth's atmosphere, search and rescue operations in buildings, water, complex, and isolated environments, security and monitoring or perimeter monitoring capabilities for law enforcement or military personnel or otherwise, where a flight vehicle's functionality changes with different modular add-on structures, where modular add-on attachments change the functionality of the vehicle by adding structural capabilities, including any of a seat, medical bed, cargo container, packet distributor, liquid distributor energy distributor, aid distributor, or any combination thereof, where modular add-on attachments change the functionality of the vehicle by adding non-hardware capabilities including control, control function, power, data, signal, information, or any combination thereof, where power, data, navigation, control or other signals are passed standardized attachment points, connection mechanisms, where control functions, communication to motor and thrust controls, navigation and GPS information is passed through standardized attachment points, and where a connection device may include auto-release or fast release or quick release capabilities, which may allow the modular add-ons to be changed quickly, or to remove quickly for safety or may include an auto-eject feature for safety or quick deploy for cargo.

Other embodiments of the replacement module may include, but are not limited to, crop dusting, all forms of cargo delivery, carrying toxic of nuclear waste, testing capability for soil, water, blood, and or other bodily or other materials for medical, environmental or other tests as required, surveying or monitoring large areas of territory, carrying of water or other anti-fire chemicals to serve as a fire deterrent, scouting or exploration capabilities for a variety of industries, ship to ship or ship to shore transportation of both personnel and/or cargo, including information or data, physical maintenance and/or monitoring of maintenance required including on or over land, sea or otherwise, use on Earth, underground, in space or outside of the Earth and the Earth's atmosphere, search and rescue operations in buildings, water, complex, and isolated environments, security and monitoring or perimeter monitoring capabilities for law enforcement or military personnel or otherwise.

An embodiment of the invention includes the connection of a replacement module on to a platform structure, which may be a vehicle or otherwise. Additionally, this embodiment of the connection mechanism may serve a purpose or provide a capability, and includes, but is not limited to, all sources of power, vehicle control and maneuverability, communication to motors, navigation information as shown in FIG. 6, and FIG. 7, that will be required to operate both the platform vehicle and the replacement module.

In an embodiment of the present invention, a connection module may receive packets-for-distribution from the platform structure, which are fed into the replacement module, and distributed (25.14). Aid packages may be stored in a platform structure or a replacement module, and fed to a replacement module or a second replacement module, and dropped, sent, shot out from, or distributed to aid recipients. Likewise, energy, liquid non-liquid or projectiles may be stored in the platform structure or replacement module, and moved to a platform structure or replacement module, or secondary or tertiary replacement module, and distributed or shot out from replacement module or platform structure.

In accordance with the methodology and apparatus of a connection mechanism of the present invention, an embodiment of the present invention entails an apparatus that enables a structure to be connected or attached to another structure, including any combination of one or more or all of when an apparatus is structurally and functionally configured to allow a modular add-on or replacement-structure to be connected to a structure that is a flight vehicle, is configured to allow a modular add-on or replacement-structure to be connected to a structure that is a multi-rotorcraft flight vehicle, is configured to allow a modular add-on or replacement-structure to be connected to a structure that is an autonomous multi-rotorcraft flight vehicle, where the apparatus is a standardized shape and size to connect multiple different modular add-on structures to a flight vehicle, where the apparatus has standard reciprocal ports on a modular add-on structure to connect it with a flight vehicle, where the apparatus is on one more locations of a flight vehicle which enables the replacement modules to be added to the top, bottom, side, or other location on the platform structure, and that has a fast-attachment capabilities allowing a user to quickly remove and/or add the replacement modules.

Additionally, an apparatus of the present invention is configured to be a structure that connects a modular add-on structure to a flight vehicle of multi-rotorcraft including any combination of where a structure that transfers elements between the structure and connected modular add-on, where a connection apparatus may carry all aspects including power, data, and other items, information or otherwise between the structure and modular add-on, where a connection apparatus control functions, communication to motor and thrust controls, navigation and GPS information, and any other connection or information that the replacement module may require, as apparatus enables a structure to be connected or attached to another structure that transfers elements between the structure and connected modular add-on, where the connection apparatus has auto-release, an emergency release latch or switch or button or fast-release latch or switch button, connection device may include auto-release or fast release or quick release capabilities, which may allow the modular add-ons to be changed quickly, or to remove quickly for safety or may include an auto-eject feature for safety, and may use springs, pyros, hydraulics, pistons, where the connection apparatus device between modules may allow for tilting and rotation of an attached module relative to the vehicle, where a connection apparatus may include sensors that enable an attachment module or mechanism to identify a direction or object, and feed information to a module or a vehicle about the direction or object, and where a connection apparatus may directly adjust rotation, orientation or direction in order to allow a modular add-on to maintain a specific direction or orientation, maintain pointing, directionality of aim, including automatic, computer or mechanically controlled dampening, to hold an attached module in a certain position or orientation despite movement a structure or vehicle.

The concept may involve a convex, cylindrical peg connection (1.1, FIG. 6) device on top of the platform structure that plugs into a concave, cylindrical outlet located on the replacement module (12.1, FIG. 7). The connection device enables the replacement module to receive and/or transmit all sources of power, vehicle control and maneuverability, communication to motors, navigation information (6.1, 6.2, 7.1, 7.2, 25.10) or any other sources of information and physical requirements that are required to operate both the platform vehicle and the replacement module. Connections may be incorporated into any combination of shapes of connection apparatuses.

In an embodiment of the invention, the connection device may be square, rectangular (13.1), spherical, elliptical (12.1) or otherwise shaped, or it may not be a standard shape (19.2, 25.12) in the case where it is a collection of structures connected together (metal or otherwise beams attached in a certain fashion that constitutes an own structure, but isn't a regularly defined shape) wherein the structure that is added may serve a purpose or provide a capability, for example a bed that can be attached or removed from the vehicle, or a seat or cargo container that may be added to or removed from the vehicle.

In an embodiment of the invention, the connection device that attaches the replacement module to the platform structure may be a series of different mechanisms (14.1) to connect the replacement module, including, but not limited to, the following either as stand-alone or in combination with any of the methods or devices listed herein: paired or non-paired or universally paired connection points or devices (22.1, 22.2), a series of sliding rails (16.2), pivot points (15.1), springs, locks (15.4, 16.3, 17.2), pistons, hydraulics (25.6), shocks, claps, elastic coupling mechanisms (21.1, 21.4), electromagnets (18.1) or any other electromagnetic methods, magnetic coupling device, rotating hooks (17.2), clips, lock mechanisms (15.2, 15.4, 16.3, 17.2), rails or rollers (16.2), snapping mechanisms (21.5), folding mechanisms (21.5), deployable mechanisms (21.5), origami based mechanisms or deployable folding structures, chemical based connection methods, hose and lock methods, threaded connections (24.4, 24.5), swivel connections (15.4), electricity based connections, capacitor based, coupled mechanisms, hover-in-place connections, foot and hook methods (19.2), rotation or sliding apparatuses, including those with divots or dowels (15.4, 20.2), divot and pin or dowel mechanisms (20.1, 20.2), butterfly or other slot or angled slot based methods (20.1, 20.2), asymmetric shaped components (25.12), grip based connection mechanisms that hold the replacement module in place, including with grip, grit or traction and a force or pressure to hold the replacement module in place, gravity, force of gravity or centripetal force based mechanisms to hold the replacement module in place, ratchet clips or bindings, robotic arms or clamps (21.5), claws, grabbers (21.5), auto-release (16.4), including springs, pyros, hydraulics, pistons (25.6), emergency release latch or switch or button or fast-release latch or switch button (16.4, 4.3).

In addition, embodiments of the connection component that allows the connection between the platform structure and the replacement module may include thermal based connection mechanisms, wherein the temperature could be modified or maintained to create a lock-in-place connection method.

Where the connection device may be square, rectangular (13.1), spherical, elliptical (1.1, 12.1) or otherwise shaped (17.2, 19.2, 20.1, 25.12), and, or, the connection device may not be a standard shape in the case where it is a collection of points or structures (14.1) or a set of other mechanical apparatuses that enable connection (25.2) connected together (metal or otherwise beams attached in a certain fashion that constitutes an own structure, but isn't a regularly defined shape)

The connection device that attaches the platform structure to the replacement module may be a series of different mechanisms including, but not limited to, the following either as stand-alone or in combination with any of the methods or devices listed herein: paired or non-paired or universally paired connection points or devices (22.2), a series of sliding rails (16.2), pivot points, springs, locks, pistons, hydraulics, shocks, claps, elastic coupling mechanisms, electromagnets or any other electromagnetic methods, magnetic coupling device, rotating hooks, clips, lock mechanisms, rails, rollers, snapping mechanisms, folding mechanisms, deployable mechanisms, origami based mechanisms or deployable folding structures, chemical based connection methods, hose and lock methods, threaded connections, swivel connections, electricity based connections, capacitor based, coupled mechanisms, hover-in-place connections, foot and hook methods, rotation or sliding apparatuses, including those with divots or dowels, divot and pin or dowel mechanisms, butterfly or other slot or angled slot based methods, asymmetric shaped components, grip based connection mechanisms that hold the replacement module in place, including with grip, grit or traction and a force or pressure to hold the replacement module in place, gravity, force of gravity or centripetal force based mechanisms to hold the replacement module in place, ratchet clips or bindings, robotic arms or clamps, claws, grabbers, auto-release, including springs, pyros, hydraulics, pistons, emergency release latch or switch or button or fast-release latch or switch button.

In an embodiment of the present invention, a connection method may include sensors (25.8, 25.9) that enable an attachment module or mechanism to identify a direction or object, and feed information to a mod, or to directly adjust rotation, orientation, or direction in order to allow a mod to maintain a specific direction or orientation.

The connection device that attaches the platform structure to the replacement module may also include, but is not limited to, the following either as stand-alone or in combination with any of the methods or devices listed herein:

rubber damping mechanisms (24.2, 25.13) or electromagnetic wave-based damping methods, pins, locking pins, pistons, screws, nuts, wingnuts or threaded rotating devices, non-threaded rotating devices, fixtures, rope, threaded methods, cable, chains, and bindings (21.2, 21.4). The connection apparatus device between modules may allow for tilting and rotation of an attached module relative to the vehicle (11.2, 25.2).

In an embodiment of the present invention, an apparatus may be a flight vehicle that is a multi-rotorcraft flight vehicle, and in the accordance with the method and an apparatus of the present invention it may be configured to have at least one standardized connection mechanisms that attach modular add-on structures on a top, side, bottom, where, in accordance with the method and an apparatus of the present invention a multi-rotorcraft flight vehicle is configured to perform different functions and have capabilities with the attachment of different modular add-on structures, such that in accordance with the method and an apparatus of the present invention standardized attachment modular add-on structures are formatted to allow the attachment and removal of modular add-on structures, and enable transferring of items, signals, communication, information between modular add-on structures and the multi-rotorcraft and or additional or other modular add-on structures and or connection modules.

The connection device may include auto-release or fast release or quick release capabilities, which may allow the modular add-ons to be changed quickly, or to remove quickly for safety or may include an auto-eject feature for safety.

In an embodiment of the present invention where the platform structure is an exoskeleton or bodysuit (23.1), any of the described or non-described connection methods may be used, including a rectangular connection method (23.4, 23.5), and a capability adding mechanism (23.2) may allow flight, or may allow other uses the propelling lasers, liquid or projectiles in a direction, or may be cameras or any other apparatus that can be added to the platform structure.

The replacement modules may have parachutes or their own flight enabling capabilities (23.6), which may be part of attachment capabilities or emergency ejection, flight or emergency landing capabilities, including propellers, rockets, propane or jet fuel or solid rocket motors or otherwise. Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A flight vehicle comprising:
 a platform structure comprising at least one connection mechanism configured for releasably and interchangeably attaching a plurality of modular structures of different functional types to the platform structure, the plurality of modular structures comprising at least one non-flight-enabling structure; and
 an adaptive control system configured, upon any modular structure of the plurality of modular structures being attached to the platform structure at the at least one connection mechanism, to adjust vehicle control of the flight vehicle based on a functional type of the attached modular structure.

2. The flight vehicle according to claim 1, wherein the adaptive control system is configured, upon any modular structure of the plurality of modular structures being attached to the platform structure at the at least one connection mechanism, to adjust vehicle control of the flight vehicle based on one or more signals received from the at least one connection mechanism at which the modular structure is attached to the platform structure.

3. The flight vehicle according to claim 2, wherein the adaptive control system is configured to adjust vehicle control of the flight vehicle based on one or more signals chosen from: vehicle control signals; motor controls signals; thrust controls signals; maneuverability control signals; navigation information signals; and GPS information signals.

4. The flight vehicle according to claim 1, wherein the adaptive control system is configured, upon any modular structure of the plurality of modular structures being attached to the platform structure at the at least one connection mechanism, to adjust vehicle control of the flight vehicle based on one or more signals received from the modular structure attached to the platform structure at the at least one connection mechanism.

5. The flight vehicle according to claim 4, wherein the adaptive control system is configured to adjust vehicle control of the flight vehicle based on one or more signals chosen from: vehicle control signals; motor controls signals; thrust controls signals; maneuverability control signals; navigation information signals; and GPS information signals.

6. The flight vehicle according to claim 1, wherein the adaptive control system is configured, upon one or more modular structures of the plurality of modular structures being attached to the platform structure at the at least one connection mechanism, or upon the addition of a payload to the platform structure, to adjust vehicle control of the flight vehicle based on one or more physical characteristics of: the platform structure, the one or more modular structures attached to the platform structure, one or more payloads added to the platform structure, or a combined system of the platform structure with the one or more modular structures attached thereto and/or one or more payloads added thereto.

7. The flight vehicle according to claim 6, wherein the adaptive control system is configured to adjust vehicle control of the flight vehicle based on one or more physical characteristics chosen from: a platform structure form factor; a platform structure center of gravity; a change in platform structure center of gravity; a center of gravity of one or more payloads; a change in a center of gravity of one or more payloads; a modular structure form factor; a modular structure center of gravity; a change in modular structure center of gravity; a combined system form factor; a combined system center of gravity; and a change in combined system center of gravity.

8. The flight vehicle according to claim 7, wherein the adaptive control system is configured such that, when an attached modular structure is a payload carrying structure, a modular structure form factor accounts for a payload form factor; a modular structure center of gravity accounts for a payload center of gravity; and a change in modular structure center of gravity accounts for a change in payload center of gravity.

9. The flight vehicle according to claim 6, wherein
the adaptive control system is configured to adjust vehicle control of the flight vehicle based on one or more physical characteristics of one or more modular structures of the plurality of modular structures based on signals received from the one or more attached modular structures and/or one or more connection mechanisms at which the one or more modular structures are attached to the platform structure.

10. The flight vehicle according to claim 1, wherein
the adaptive control system is configured to dynamically adjust vehicle control.

11. The flight vehicle according to claim 10, wherein
the adaptive control system is configured to dynamically adjust vehicle control upon a change in an attachment state of any modular structure of the plurality of modular structures at a connection mechanism.

12. The flight vehicle according to claim 10, wherein
the adaptive control system is configured to dynamically adjust vehicle control of the flight vehicle during flight of the flight vehicle.

13. The flight vehicle according to claim 1, wherein
the one or more connection mechanisms are configured, upon one or more modular structures of the plurality of modular structures being attached at the one or more connection mechanisms, to enable a transfer between the one or more modular structures attached at the one or more connection mechanisms and the platform structure.

14. The flight vehicle according to claim 13, wherein
the one or more connection mechanisms are configured, upon one or more modular structures of the plurality of modular structures being attached at the one or more connection mechanisms, for enabling a transfer of signals between the one or more modular structures attached at the one or more connection mechanisms and the platform structure.

15. The flight vehicle according to claim 14, wherein
the one or more connection mechanisms are configured to transfer signals chosen from: power signals; control signals; data signals; telemetry signals; electromagnetic signals; global positioning information; and sensor signals.

16. The flight vehicle according to claim 13, wherein
the one or more connection mechanisms are configured, upon one or more modular structures of the plurality of modular structures being attached at the one or more connection mechanisms, to enable transfer of a supply feed between the one or more modular structures attached at the one or more connection mechanisms and the platform structure.

17. The flight vehicle according to claim 16, wherein
the one or more connection mechanisms are configured to transfer a supply feed chosen from: a fluid flow; a particle flow; organic or non-organic materials; mechanical constructs; and ammunition.

18. The flight vehicle according to claim 1, wherein
adjustments to vehicle control of the flight vehicle comprises adjustments to: control parameters, control equations, control functions, and control algorithms.

19. The flight vehicle according to claim 1, wherein
the plurality of modular structures comprises at least one modular structure chosen from the group of: a passenger seat, a steering control, a medical bed, a cargo container, a packet distributor, a liquid distributor, an energy distributor, an aid distributor, or any combination thereof.

20. The flight vehicle according to claim 1, wherein
the adaptive control system is configured to adapt the vehicle control of the flight vehicle based on a functional type of at least one modular structure of the plurality of modular structures chosen from the group of: a passenger seat, a steering control, a medical bed, a cargo container, a packet distributor, a liquid distributor, an energy distributor, an aid distributor, or any combination thereof.

21. A flight system, comprising:
the flight vehicle according to claim 1; and
a plurality of modular structures configured for releasable and interchangeable attachment with the platform structure of the flight vehicle.

22. A flight vehicle comprising:
a platform structure comprising at least two connection mechanisms each configured for releasably attaching at least one non-flight-enabling modular structure to the platform structure; and
an adaptive control system configured, upon two modular structures being attached to the platform structure at the at least two connection mechanisms, to adjust vehicle control of the flight vehicle based on one or both of the two attached modular structures,
wherein the at least two connection mechanisms are configured, upon a first modular structure of the two modular structures being attached to a first connection mechanism and a second modular structure of the two modular structures being connected to a second connection mechanism, to enable a transfer, through the platform structure, from the first modular structure attached to the first connection mechanism to the second modular structure attached to the second connection mechanism.

* * * * *